US012504600B2

(12) United States Patent
Mori

(10) Patent No.: US 12,504,600 B2
(45) Date of Patent: Dec. 23, 2025

(54) OPTICAL ADJUSTMENT MECHANISM

(71) Applicant: FUJIFILM Corporation, Tokyo (JP)

(72) Inventor: Yasuhiro Mori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 594 days.

(21) Appl. No.: 17/813,407

(22) Filed: Jul. 19, 2022

(65) Prior Publication Data
US 2023/0032975 A1    Feb. 2, 2023

(30) Foreign Application Priority Data

Jul. 30, 2021 (JP) ................... 2021-125279
Apr. 25, 2022 (JP) ................... 2022-071468

(51) Int. Cl.
*G02B 7/02* (2021.01)
(52) U.S. Cl.
CPC ............. *G02B 7/023* (2013.01); *G02B 7/026* (2013.01)
(58) Field of Classification Search
CPC .......... G02B 7/04; G02B 7/023; G02B 7/026; G03B 17/12; G03B 17/14; G03B 5/06
See application file for complete search history.

(56) References Cited

U.S. PATENT DOCUMENTS

| | | |
|---|---|---|
| 2013/0107381 A1 | 5/2013 | Ezawa et al. |
| 2014/0168793 A1 | 6/2014 | Fukino |
| 2018/0039042 A1 | 2/2018 | Suzuki |
| 2019/0146176 A1 | 5/2019 | Sano et al. |
| 2019/0310439 A1 * | 10/2019 | Sato ................... G03B 5/00 |
| 2020/0183262 A1 * | 6/2020 | Wang .............. G03B 21/2046 |
| 2021/0240003 A1 * | 8/2021 | Sazai ................ G02B 27/646 |

FOREIGN PATENT DOCUMENTS

| | | | |
|---|---|---|---|
| EP | 3 220 176 A1 | 9/2017 | |
| EP | 3220176 B1 * | 8/2019 | ............ G02B 7/023 |
| JP | 2007-052335 A | 3/2007 | |

(Continued)

OTHER PUBLICATIONS

Miyaji, English translation for JP-2013171272-A (Year: 2013).*

(Continued)

*Primary Examiner* — Jonathan Y Jung
(74) *Attorney, Agent, or Firm* — Studebaker Brackett PLLC

(57) ABSTRACT

One embodiment according to the technique of the present disclosure provides an optical adjustment mechanism that adjusts a position and/or a tilt of an optical element. An optical adjustment mechanism according to one aspect of the present invention includes: an outer frame; an inner frame that is held by the outer frame and holds an optical element; a biasing member that is disposed around the outer frame and biases the inner frame in an optical axis direction of the optical element; and an axial deviation suppression portion that suppresses deviation of the inner frame in a direction intersecting the optical axis direction with respect to the outer frame, in which the axial deviation suppression portion has protruding portions disposed at a plurality of locations of the outer frame around the optical axis and protruding in the optical axis direction and contact portions formed in the inner frame and coming into contact with the respective protruding portions.

19 Claims, 31 Drawing Sheets

(56) References Cited

FOREIGN PATENT DOCUMENTS

| | | | |
|---|---|---|---|
| JP | 2013171272 A | * | 9/2013 |
| JP | 2013-228499 A | | 11/2013 |
| JP | 2016-118614 A | | 6/2016 |
| JP | 2017-167466 A | | 9/2017 |
| JP | 2018-022008 A | | 2/2018 |
| JP | 2018-197872 A | | 12/2018 |
| JP | 2019-086733 A | | 6/2019 |
| JP | 2021-051181 A | | 4/2021 |
| WO | 2012/004995 A1 | | 1/2012 |

OTHER PUBLICATIONS

"Notice of Reasons for Refusal" Office Action issued in JP 2022-071468; mailed by the Japanese Patent Office on Oct. 23, 2025.

* cited by examiner

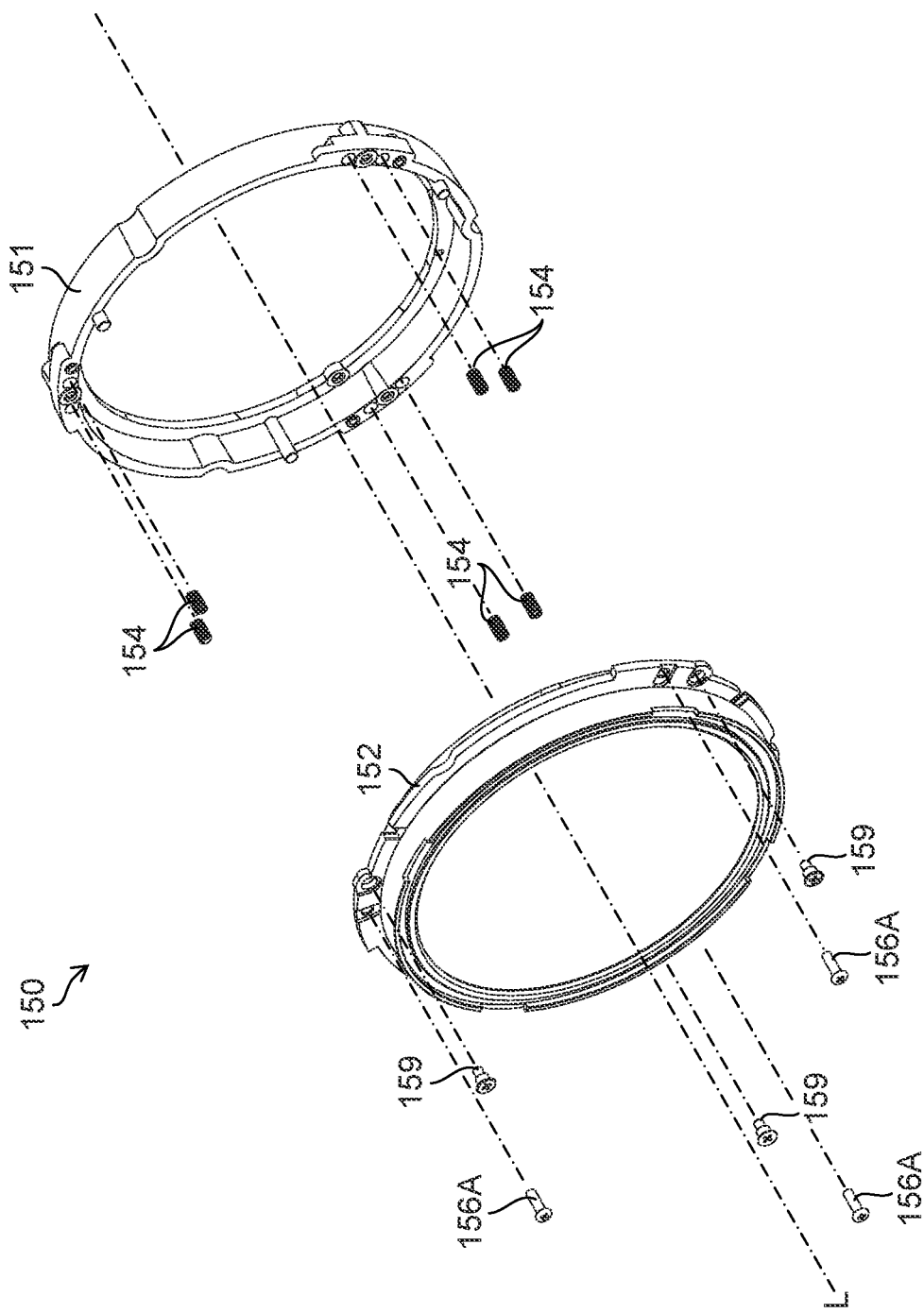

OPTICAL ADJUSTMENT MECHANISM

CROSS-REFERENCE TO RELATED APPLICATION

The present application claims priorities under 35 U.S.C § 119(a) to Japanese Patent Application No. 2021-125279 filed on Jul. 30, 2021 and Japanese Patent Application No. 2022-071468 filed on Apr. 25, 2022, each of which is hereby expressly incorporated by reference, in its entirety, into the present application.

BACKGROUND OF THE INVENTION

1. Field of the Invention

The present invention relates to an optical adjustment mechanism that is used to adjust an optical element.

2. Description of the Related Art

With regard to a technique for adjusting an optical element, for example, JP2018-022008A discloses that a cylindrical cam is rotated to adjust a tilt of a lens holding frame. Further, JP2017-167466A discloses that a protrusion is inserted into a reception hole and a tilt of a lens holding member is adjusted by a tilt adjustment washer. Further, JP2018-197872A discloses that guide bars are inserted into respective holes to adjust a tilt of a lens holding frame, and that sizes or directions of the holes are different from each other.

SUMMARY OF THE INVENTION

One embodiment according to the technique of the present disclosure provides an optical adjustment mechanism that adjusts a position and/or a tilt of an optical element.

There is provided an optical adjustment mechanism according to a first aspect of the present invention comprising: an outer frame; an inner frame that is held by the outer frame and holds an optical element; a biasing member that is disposed around the outer frame and biases the inner frame in an optical axis direction of the optical element; and an axial deviation suppression portion that suppresses deviation of the inner frame in a direction intersecting the optical axis direction with respect to the outer frame, in which the axial deviation suppression portion has protruding portions disposed at a plurality of locations of the outer frame around the optical axis and protruding in the optical axis direction and contact portions formed in the inner frame and coming into contact with the respective protruding portions.

In the optical adjustment mechanism according to a second aspect of the present invention, in the first aspect, an adjustment mechanism that presses the inner frame in a direction opposite to a direction of the bias, through a first pressing member is further provided.

In the optical adjustment mechanism according to a third aspect of the present invention, in the second aspect, the first pressing member comes into point contact with a convex portion provided on the inner frame.

In the optical adjustment mechanism according to a fourth aspect of the present invention, in the second or third aspect, the first pressing member is an eccentric roller, a taper pin, or a cylindrical cam.

In the optical adjustment mechanism according to a fifth aspect of the present invention, in any one of the second to fourth aspects, a position of the inner frame in the optical axis direction and a tilt of the inner frame in a direction intersecting the optical axis are adjusted according to an adjustment of a pressing degree of the first pressing member.

In the optical adjustment mechanism according to a sixth aspect of the present invention, in any one of the first to fifth aspects, an outer peripheral surface of the protruding portion and a contact surface of the contact portion come into point contact with each other.

In the optical adjustment mechanism according to a seventh aspect of the present invention, in the sixth aspect, the outer peripheral surface of the protruding portion and the contact surface of the contact portion come into point contact with each other at two points.

In the optical adjustment mechanism according to an eighth aspect of the present invention, in any one of the first to seventh aspects, the contact portion is a groove portion having an inner peripheral surface, and the inner peripheral surface acts as a contact surface.

In the optical adjustment mechanism according to a ninth aspect of the present invention, in the first aspect, the contact portion is a one-sided portion having a one-sided surface.

In the optical adjustment mechanism according to a tenth aspect of the present invention, in the ninth aspect, an outer peripheral surface of the protruding portion and the one-sided surface of the one-sided portion come into point contact with each other at one point.

In the optical adjustment mechanism according to an eleventh aspect of the present invention, in any one of the first to tenth aspects, the contact portions are disposed at three or more locations of the inner frame around the optical axis.

In the optical adjustment mechanism according to a twelfth aspect of the present invention, in any one of the first to eleventh aspects, one or more contact portions are disposed in each of three regions formed by dividing a plane intersecting the optical axis into three equal parts.

In the optical adjustment mechanism according to a thirteenth aspect of the present invention, in any one of the first to twelfth aspects, an outer peripheral surface of the protruding portion and a contact surface of the contact portion are each an arc surface, and the outer peripheral surface and the contact surface intersect to come into point contact with each other.

In the optical adjustment mechanism according to a fourteenth aspect of the present invention, in any one of the first to thirteenth aspects, the contact portion is a groove portion that is formed in a direction of an optical axis center from an outer peripheral portion of the inner frame and that receives the protruding portion.

In the optical adjustment mechanism according to a fifteenth aspect of the present invention, in any one of the first to fourteenth aspects, the axial deviation suppression portion is disposed on an inner peripheral side with respect to an adjustment mechanism.

In the optical adjustment mechanism according to a sixteenth aspect of the present invention, in any one of the first to fifteenth aspects, in which the outer frame further includes a stopper that restricts the inner frame from falling off in the optical axis direction due to the bias.

There is provided an optical adjustment mechanism according to a seventeenth aspect of the present invention comprising: an outer frame; an inner frame that is held by the outer frame and holds an optical element; a biasing member that is disposed around the outer frame and biases the inner frame in an optical axis direction of the optical element; and an axial deviation suppression portion that suppresses deviation of the inner frame in the optical axis direction with respect to the outer frame, in which the axial deviation suppression portion has protruding portions disposed at a plurality of locations of the outer frame around the optical axis and protruding in the optical axis direction and groove portions formed in a direction of an optical axis center from an outer peripheral portion of the inner frame and receiving the respective protruding portions.

In the optical adjustment mechanism according to an eighteenth aspect of the present invention, in the seventeenth aspect, an adjustment mechanism that presses the inner frame in a direction opposite to a direction of the bias, through a first pressing member is further provided. The optical adjustment mechanism according to the seventeenth and eighteenth aspects may have the same configuration as that of the third to sixteenth aspects.

There is provided an optical adjustment mechanism according to a nineteenth aspect of the present invention comprising: an outer frame; an inner frame that is held by the outer frame and holds an optical element; a biasing member that is disposed around the outer frame and biases the inner frame in an optical axis direction of the optical element; an axial deviation suppression portion that suppresses deviation of the inner frame in the optical axis direction with respect to the outer frame; and an adjustment mechanism that presses the inner frame in a direction opposite to a direction of the bias, through a second pressing member inserted and pulled out in the optical axis direction, in which the axial deviation suppression portion has protruding portions disposed at a plurality of locations of the outer frame around the optical axis and protruding in the optical axis direction and groove portions formed in a direction of an optical axis center from an outer peripheral portion of the inner frame and receiving the respective protruding portions.

BRIEF DESCRIPTION OF THE DRAWINGS

FIG. 18 is an exploded perspective view showing a configuration of a second optical adjustment mechanism.

DESCRIPTION OF THE PREFERRED EMBODIMENTS

One embodiment of an optical adjustment mechanism according to the present invention is as follows. A description will be given with reference to the accompanying drawings as necessary.

First Embodiment

Adjustment Using Optical Adjustment Mechanism

Optical adjustment mechanisms (first and second optical adjustment mechanisms) that are used to adjust a position of an optical element in an optical axis direction and/or a tilt (tilt angle) in a direction intersecting an optical axis will be described. An optical adjustment mechanism (third optical adjustment mechanism) that is used to adjust a shift amount of the optical element (the adjustment of a position in a plane orthogonal to the optical axis direction) and the like will be described later in "Appendix".

Configuration of Imaging System

Figure 1:
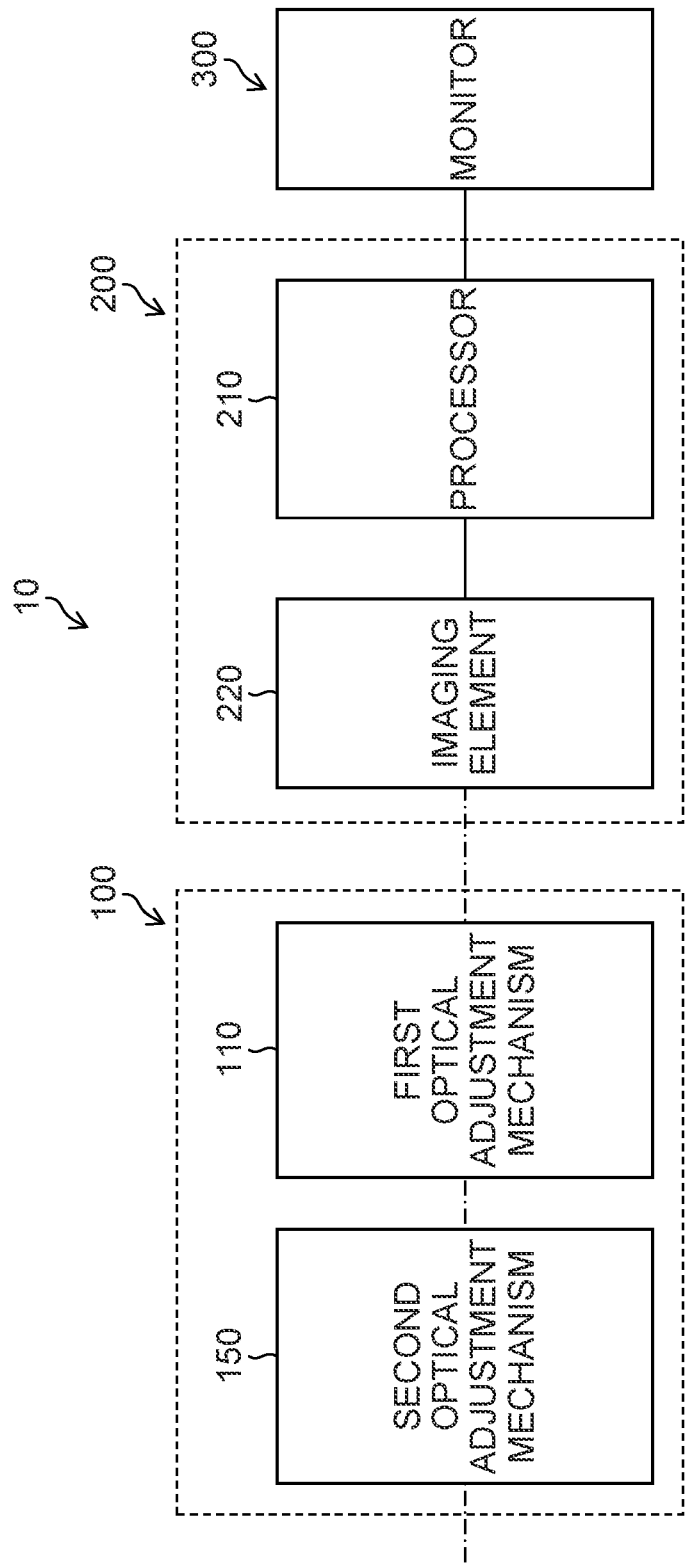
FIG. 1 is a diagram showing a schematic configuration of an imaging system according to a first embodiment.

FIG. 1 is a diagram showing a schematic configuration of an imaging system 10 according to a first embodiment. The imaging system 10 comprises a lens device 100, an imaging device main body 200, and a monitor 300 (display device), and these elements are disposed along an optical axis L (in the optical axis direction).

Configuration of Lens Device

As shown in FIG. 1, the lens device 100 comprises a first optical adjustment mechanism 110 (optical adjustment mechanism) and a second optical adjustment mechanism 150 (optical adjustment mechanism). The first optical adjustment mechanism 110 is a mechanism that is used to adjust an optical element (for example, a lens) other than an opening end (a side closest to a subject), and the second optical adjustment mechanism 150 is a mechanism that is used to adjust an optical element of the opening end. The lens device 100 may comprise only one out of the first optical adjustment mechanism 110 and the second optical adjustment mechanism 150. Alternatively, the lens device 100 may comprise a plurality of first optical adjustment mechanisms 110.

Configuration of Imaging Device Main Body

The imaging device main body 200 comprises an imaging element 220 (image sensor) and a processor 210. The imaging element 220 comprises a light receiving unit, an analog amplification unit, an A/D converter, an imaging element drive unit, and the like, and outputs an image signal indicating an image of the subject. A complementary metal-oxide semiconductor (CMOS) type imaging element or a charge-coupled device (CCD) type imaging element can be used as the imaging element 220. The processor 210 performs determined image processing on the image signal output by the imaging element 220, and causes the monitor 300 to display the image of the subject. The processor 210 is formed of, for example, a processor, such as a CPU, a GPU, and an FPGU, and a memory (a random access memory (RAM), which is used as a temporary storage area, in addition to, for example, a flash memory or a read only memory (ROM), which stores an image processing program and the like).

A user uses the imaging system 10 having the above configuration to image a subject of which the shape, dimension, color, and the like are known (for example, a grid-like chart) and causes the monitor 300 to display the imaged subject, whereby the user can adjust the position or the tilt while viewing the displayed image.

Overall Configuration of First Optical Adjustment Mechanism

Figure 2:
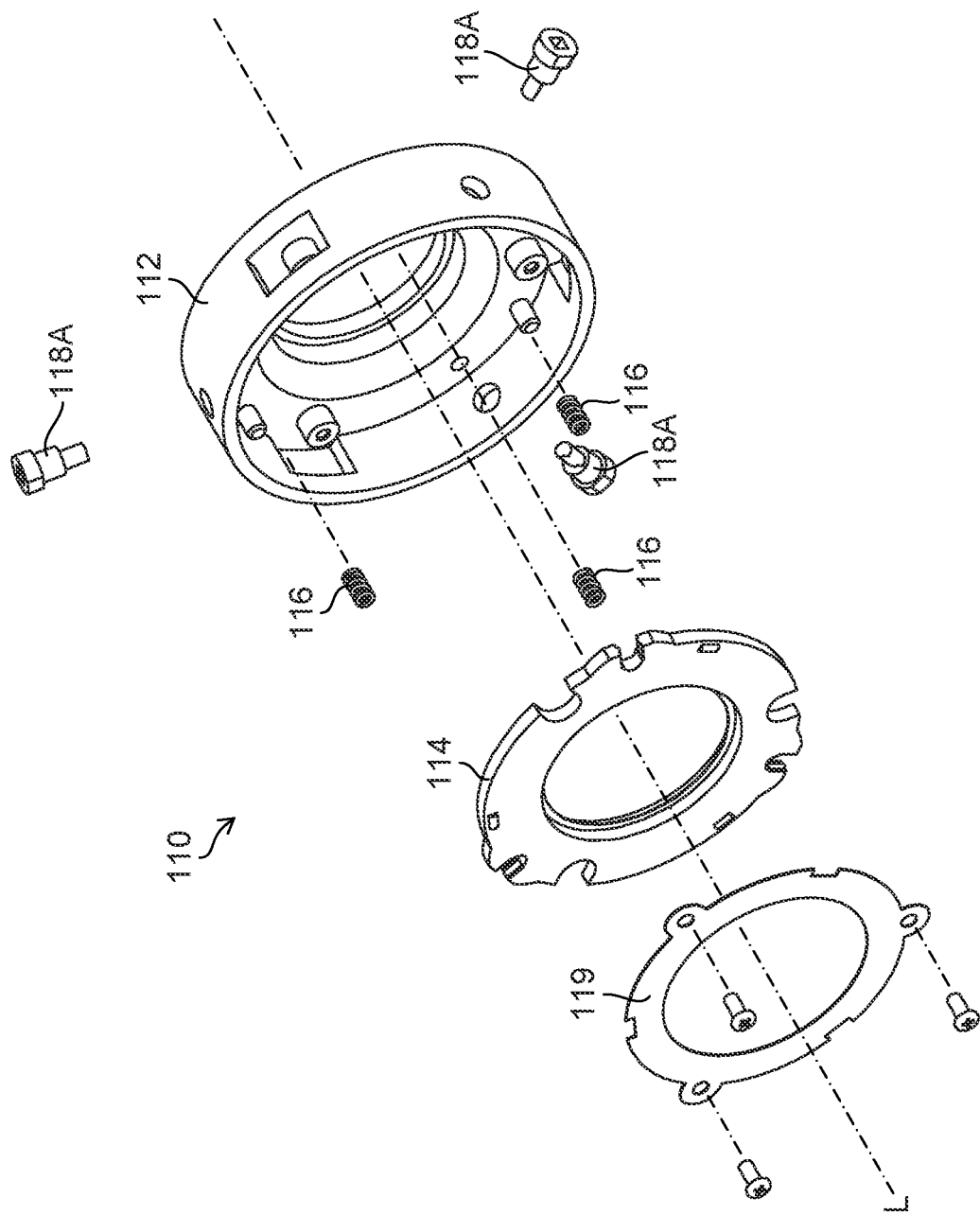
FIG. 2 is an exploded perspective view of a first optical adjustment mechanism.
Figure 3:
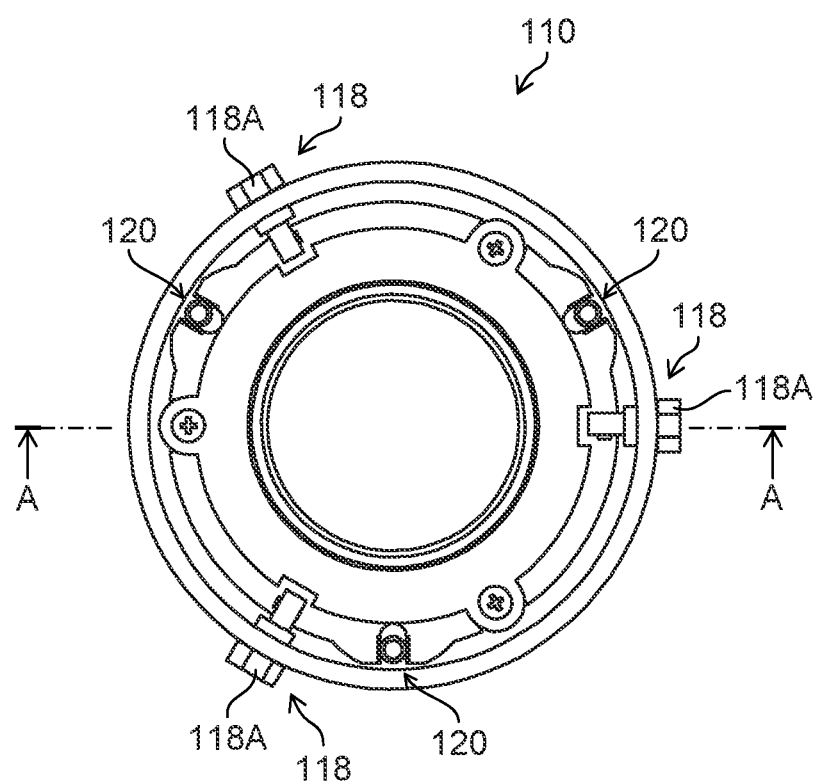
FIG. 3 is a front view of the first optical adjustment mechanism (assembled state).
Figure 4B:
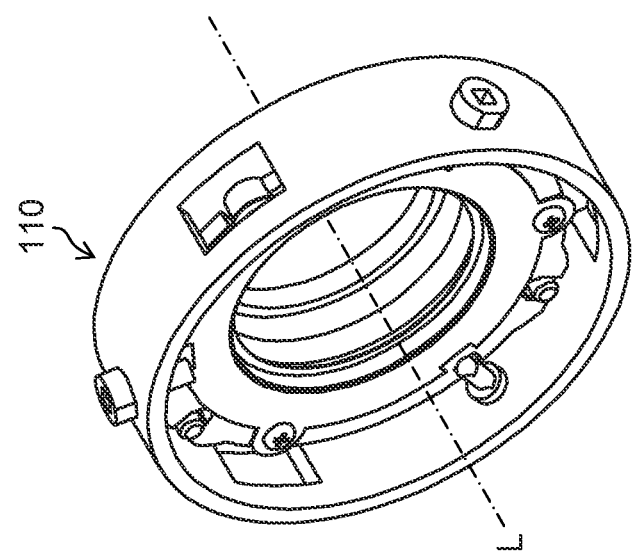
FIGS. 4A and 4B are a side view and a perspective view of the first optical adjustment mechanism (assembled state), respectively.
Figure 4A:
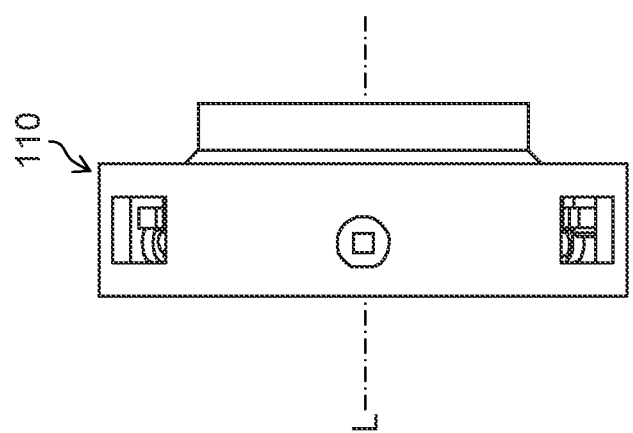
Figure 5:
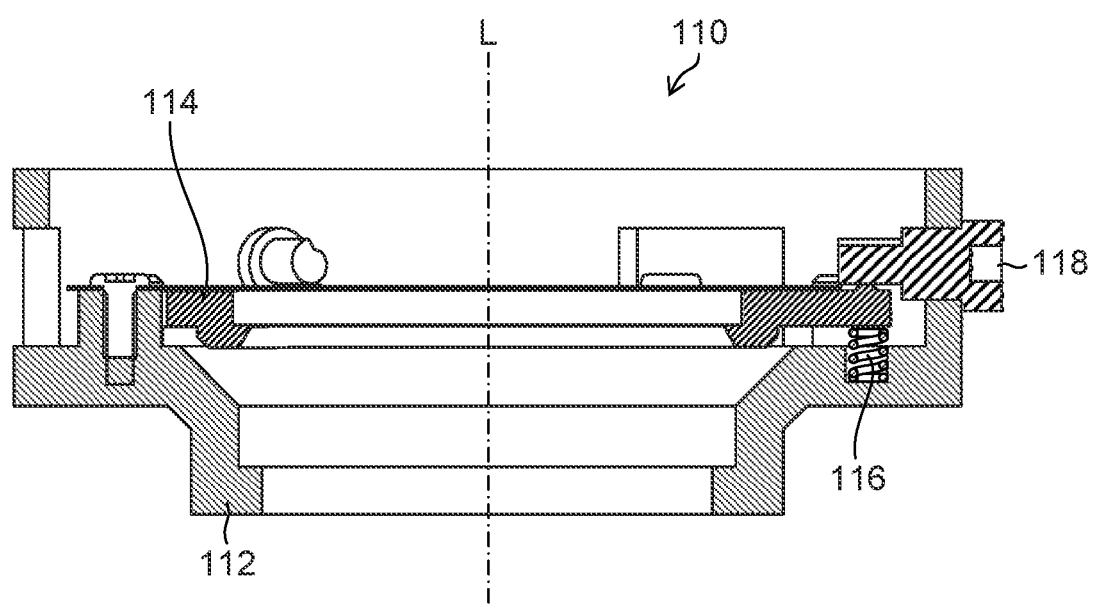
FIG. 5 is a cross-sectional view of the first optical adjustment mechanism (assembled state).

FIG. 2 is an exploded perspective view of the first optical adjustment mechanism 110, and FIGS. 3, 4A, 4B, and 5 are a front view, a side view, a perspective view, and a cross-sectional view taken along line A-A of FIG. 3 of the first optical adjustment mechanism 110 (assembled state), respectively. As shown in FIGS. 3, 4A, 4B, and 5, the first optical adjustment mechanism (optical adjustment mechanism) comprises an outer frame 112 (outer frame), an inner frame 114 (inner frame) held by the outer frame 112 and holding a lens (optical element) (not shown), and a biasing spring 116 (biasing member) that is disposed around the outer frame 112 and that biases the inner frame 114 in a direction of an optical axis L (optical axis direction; to the subject side). The biasing member may be a spring, such as a coil spring or a leaf spring, or an elastic body, such as rubber or a resin.

Further, as shown in FIG. 3, the first optical adjustment mechanism 110 comprises an axial deviation suppression portion 120 (axial deviation suppression portion) that suppresses the deviation of the inner frame 114 in a direction intersecting the optical axis direction (including the direction orthogonal to the optical axis L) with respect to the outer frame 112 and an adjustment mechanism 118 (adjustment mechanism) that presses the inner frame 114 in a direction (direction of the imaging device main body 200) opposite to a direction of the bias performed by the biasing spring 116, and the axial deviation suppression portion 120 (axial deviation suppression portion) is formed of a protruding portion 122 (protruding portion) and a contact portion 124 (contact portion).

Further, as shown in FIG. 2 and the like, the first optical adjustment mechanism 110 comprises a spring bias stopper 119 (stopper) that restricts the inner frame 114 from falling off in the optical axis direction due to the bias of the biasing spring 116. As will be described later, although it is possible to restrict the inner frame 114 from falling off by using a plurality of adjustment mechanisms 118, it is possible to reliably restrict the inner frame 114 from falling off by fixing the inner frame 114 with the spring bias stopper 119. The spring bias stopper 119 may be integrally formed with the inner frame 114.

Disposition of Axial Deviation Suppression Portion And Adjustment Mechanism

Figure 6:
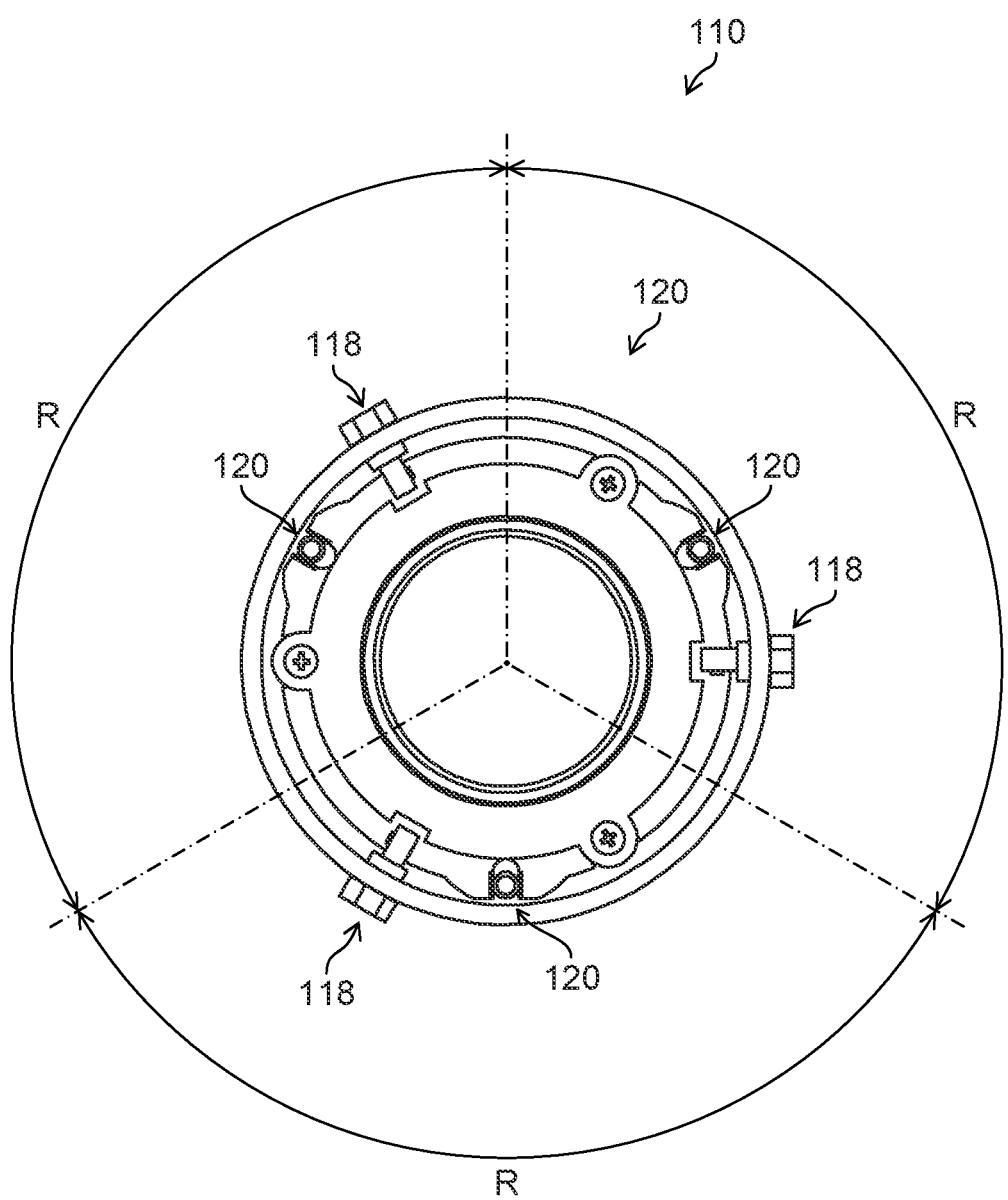
FIG. 6 is a view showing disposition of an axial deviation suppression portion and an adjustment mechanism.

FIG. 6 is a view showing the disposition of the axial deviation suppression portion 120 and the adjustment mechanism 118 in the first optical adjustment mechanism 110. As shown in FIGS. 3 and 6, the axial deviation suppression portions 120 (the protruding portions 122 and the contact portions 124) and the adjustment mechanisms 118 are each disposed at three locations of the inner frame 114 around the optical axis L (around the optical axis). Specifically, one axial deviation suppression portion 120 and one adjustment mechanism 118 are disposed in each of three regions R formed by dividing a plane orthogonal to the optical axis L (one aspect of intersection) into three equal parts. In this way, the axial deviation suppression portions 120 are disposed at three locations, so that the position and the tilt of the inner frame 114 can be defined. The phase of disposition (disposition positions around the optical axis L) is different between the axial deviation suppression portion 120 and the adjustment mechanism 118.

Configuration of Axial Deviation Suppression Portion

Figure 7:
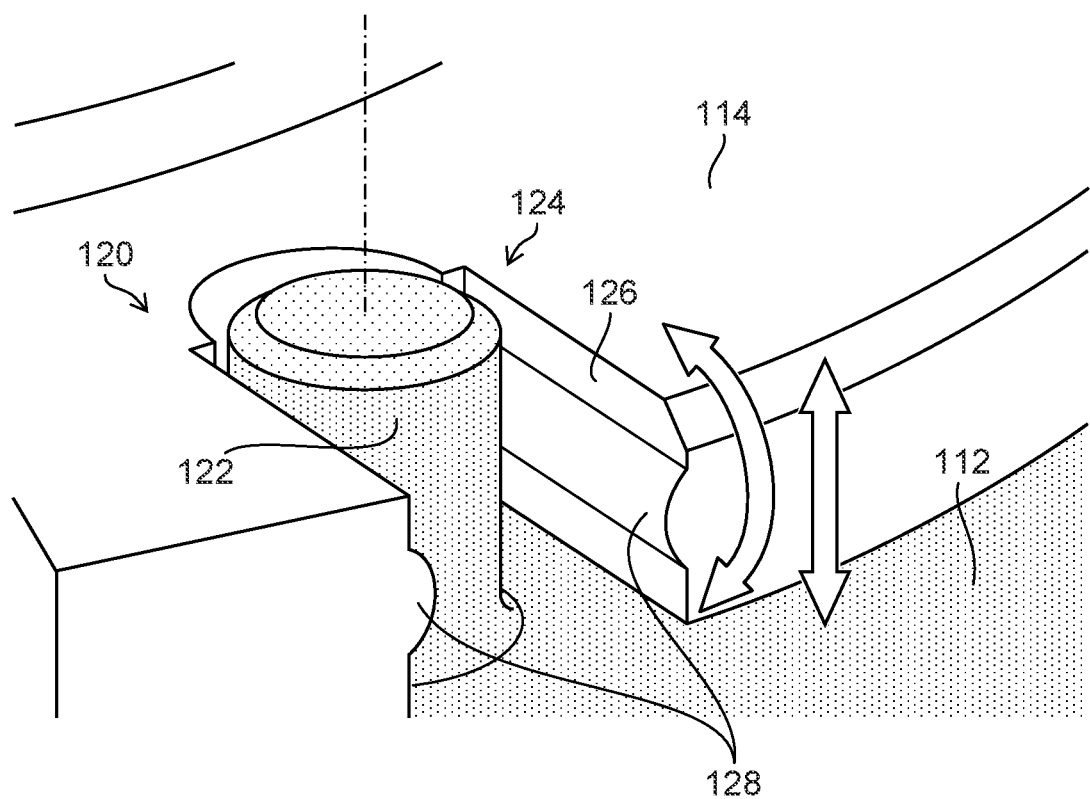
FIG. 7 is a perspective view (partially enlarged view) showing a configuration of the axial deviation suppression portion.
Figure 8:
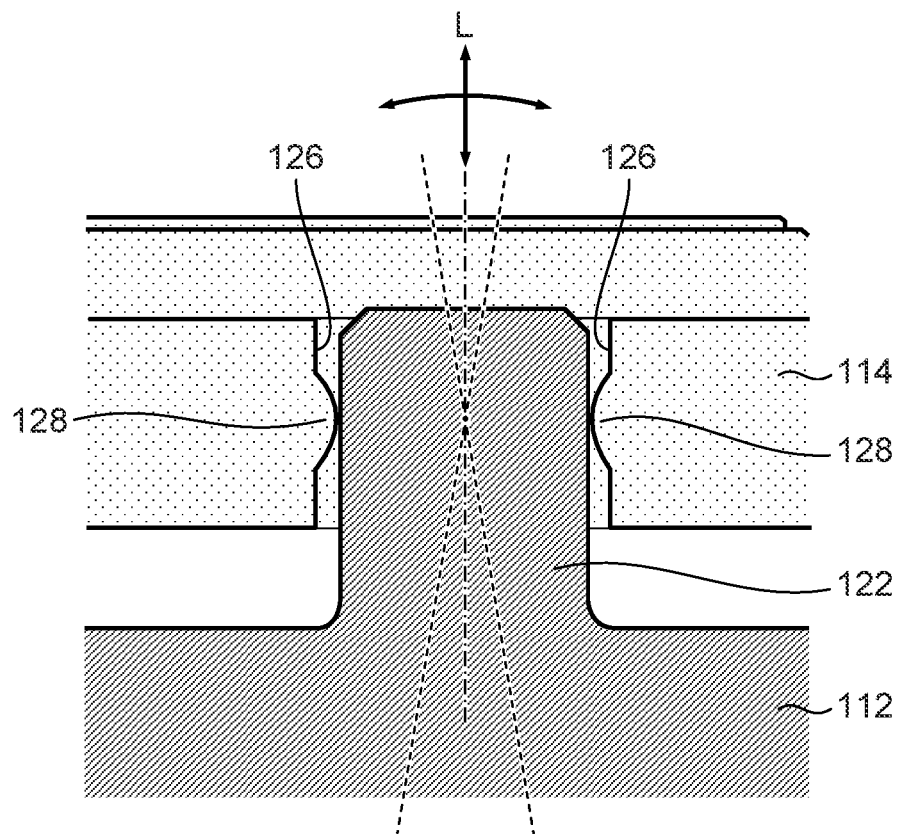
FIG. 8 is a cross-sectional view showing the configuration of the axial deviation suppression portion.

FIG. 7 is a perspective view (partially enlarged view) showing the configuration of the axial deviation suppression portion 120, and FIG. 8 is a cross-sectional view showing the configuration of the axial deviation suppression portion 120. As shown in FIGS. 7 and 8, the axial deviation suppression portion 120 comprises the protruding portion 122 (protruding portion) and the contact portion 124 (contact portion). The protruding portions 122 are cylindrical members disposed at a plurality of locations (in FIGS. 3 and 6, three locations) of the outer frame 112 around the optical axis L (around the optical axis) and protruding in the direction of the optical axis L.

Meanwhile, the contact portion 124 is formed in the inner frame 114 and comes into contact with the protruding portion 122. Specifically, the contact portion 124 is a U-shaped groove portion formed in a direction of the optical axis center from the outer peripheral portion of the inner frame 114 and receiving the protruding portion 122, two semi-cylindrical protrusions 128 (contact surfaces) facing each other are provided on an inner peripheral surface 126 of the groove portion, and the inner peripheral surface 126 and the protrusions 128 act as the contact surfaces.

Deviation Suppression by Axial Deviation Suppression Portion

The outer peripheral surface of the protruding portion 122 and the contact surface (protrusion 128) of the contact portion 124 described above are each an arc surface, and the arc surfaces intersect with each other, whereby the protrusion 128 and the outer peripheral surface of the protruding portion 122 come into point contact with each other. With this, it is possible to adjust the tilt of the inner frame 114 with respect to the protruding portion 122 (the tilt of the inner frame 114 with respect to the outer frame 112; an arc-shaped double-headed arrow direction in FIG. 7) and the position in the optical axis direction (the position in a linear double-headed arrow direction in FIG. 7) (in FIG. 8, the direction of the optical axis L is indicated by a solid line, and the direction intersecting the direction of the optical axis L is indicated by a dotted line). In addition, the protrusion 128 comes into point contact with the outer peripheral surface of the protruding portion 122, so that the deviation of the tilt center can be suppressed. Further, in the above-described aspect, since the axial deviation suppression portions 120 are provided at three or more locations, it is possible to suppress the center deviation with respect to the optical axis L and the rotational deviation in the plane orthogonal to the optical axis L.

In the example shown in FIG. 6 and the like, the axial deviation suppression portions 120 and the adjustment mechanisms 118 are each disposed at three locations around the optical axis L, but the axial deviation suppression portions 120 and the adjustment mechanisms 118 may be each disposed at four or more locations around the optical axis L, and two or more axial deviation suppression portions 120 and two or more adjustment mechanisms 118 may be disposed in each of the three regions R.

Figure 9:
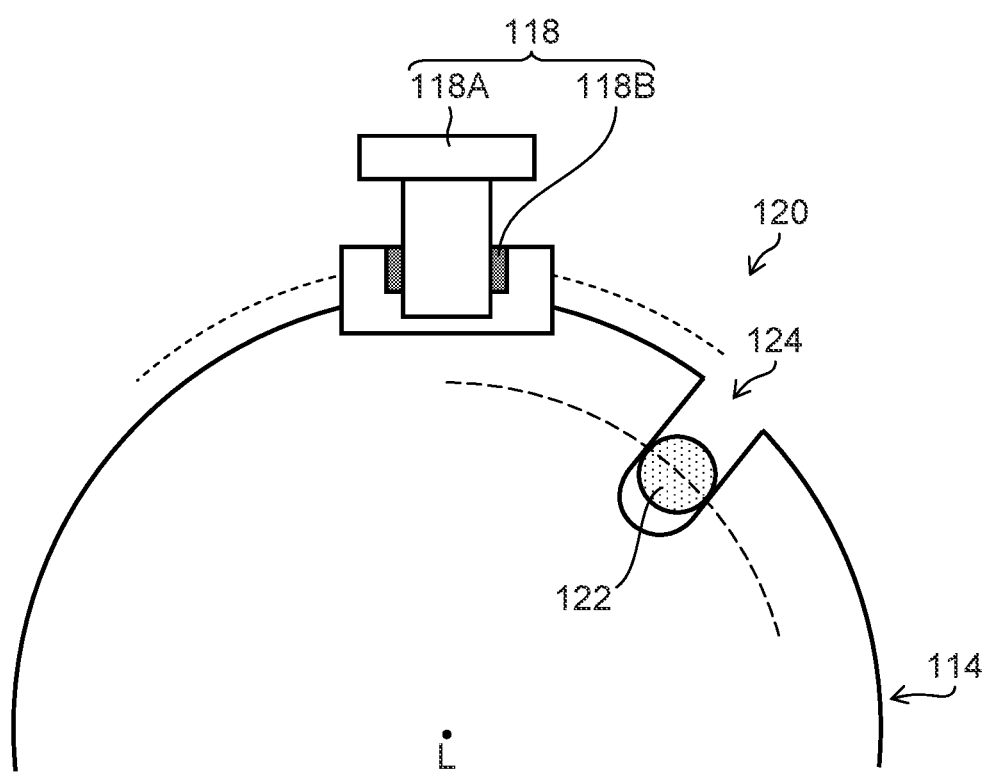
FIG. 9 is a view showing a disposition relationship between the axial deviation suppression portion and the adjustment mechanism.

Positional Relationship Between Axial Deviation Suppression Portion And Adjustment Mechanism FIG. 9 is a schematic view (partially enlarged view) showing the positional relationship between the axial deviation suppression portion 120 and the adjustment mechanism 118 (the shape of each member is simplified), and the dotted lines in FIG. 9 indicate point contact positions in the radial direction in the axial deviation suppression portion 120 and the adjustment mechanism 118. As shown in FIG. 9, the axial deviation suppression portion 120 is disposed on the inner peripheral side (the side closer to the optical axis L) with respect to the adjustment mechanism 118, so that the size can be reduced as compared with an aspect in which the outer peripheral portion of the inner frame 114 is used to suppress the axial deviation.

Modification Example of Configuration of Axial Deviation Suppression Portion

Figure 10A:
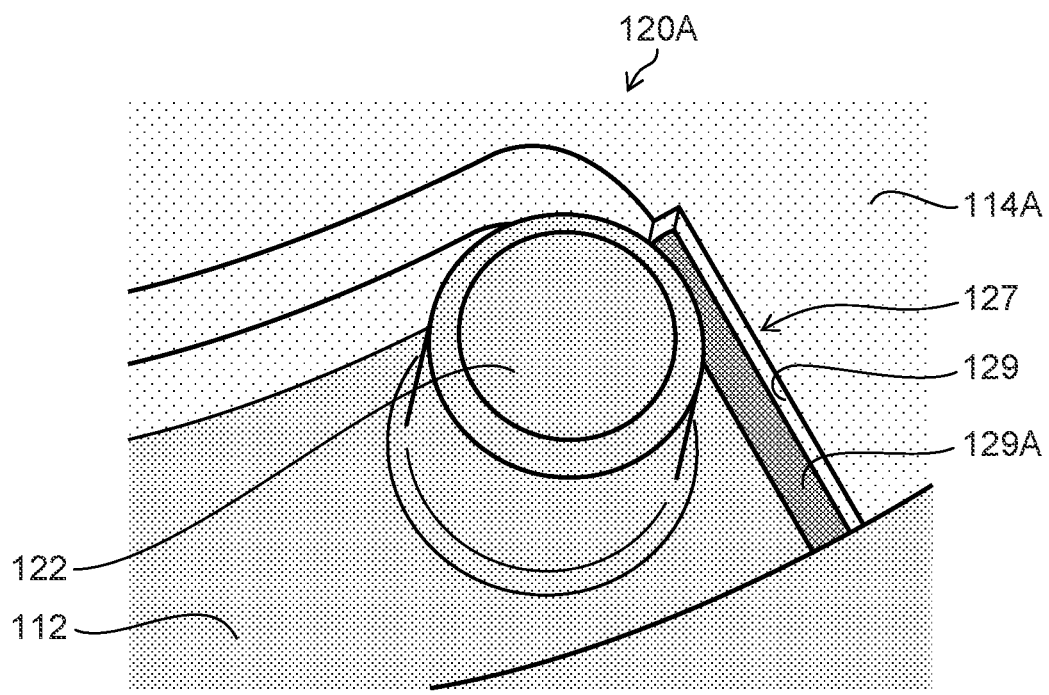
FIGS. 10A and 10B are views showing a modification example of the configuration of the axial deviation suppression portion.
Figure 10B:
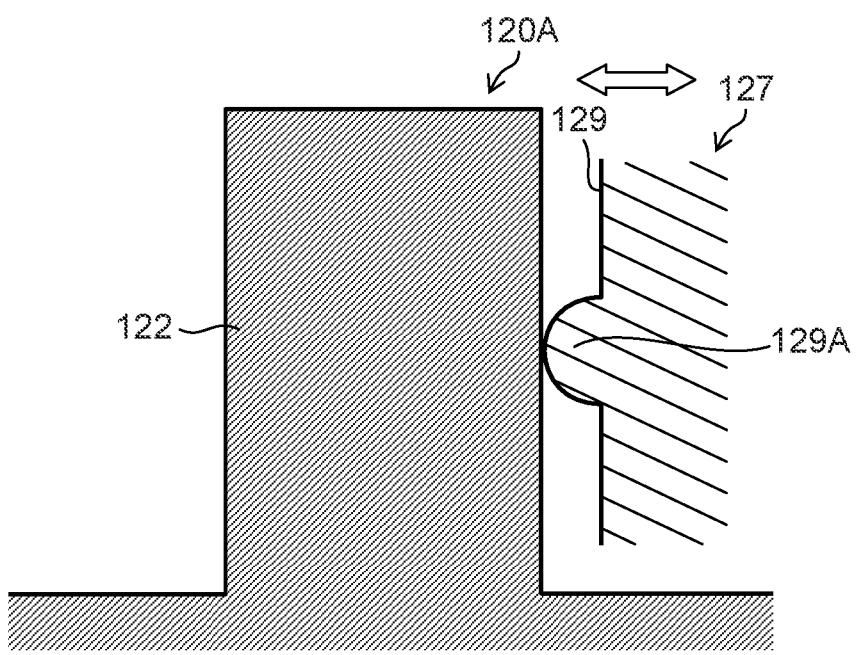

FIGS. 10A and 10B are views showing a modification example of the configuration of the axial deviation suppression portion (axial deviation suppression portion 120A). As shown in FIG. 10A, a contact portion of the axial deviation suppression portion 120A may be a one-sided portion 127 having a one-sided surface 129, which is formed on the inner frame 114A. As shown in FIGS. 10A and 10B, the outer peripheral surface of the protruding portion 122 and the one-sided surface 129 of the one-sided portion 127 come into point contact with each other at one point through a protrusion 129A. In FIG. 10B, the movement direction of the inner frame 114A with respect to the outer frame 112 is indicated by a linear double-headed arrow.

Configuration of Adjustment Mechanism

Figure 11A:
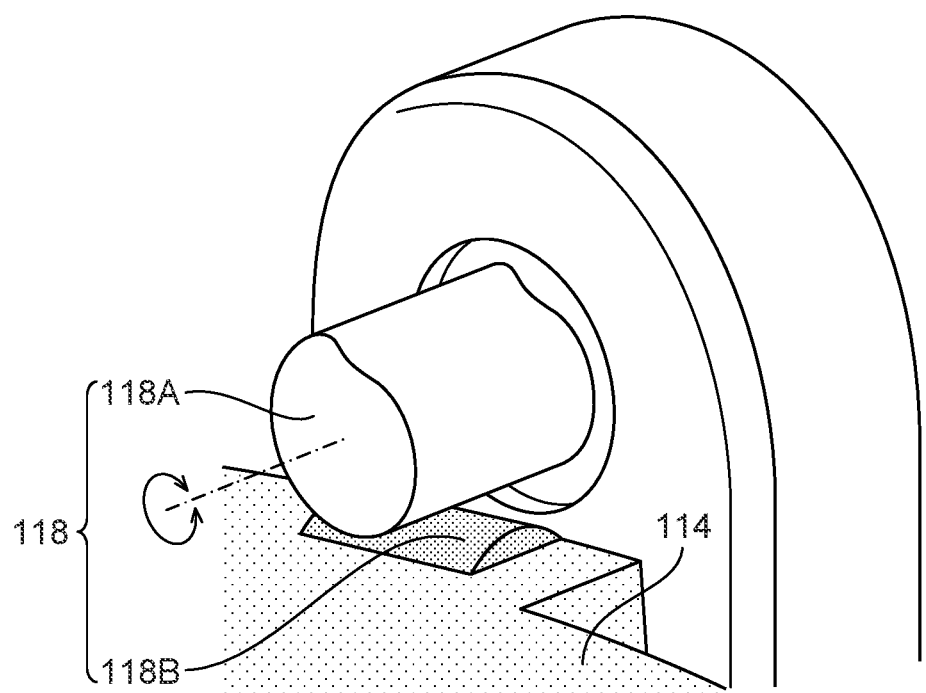
FIGS. 11A and 11B are views showing an example of a configuration of the adjustment mechanism.
Figure 11B:
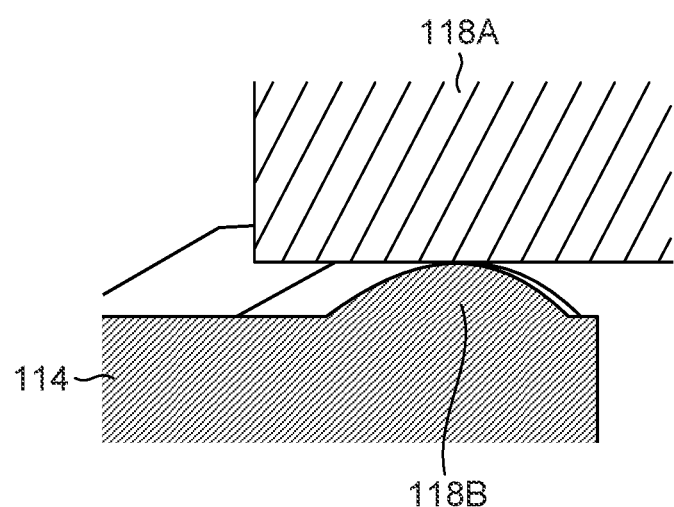

FIGS. 11A and 11B are views showing an example of the configuration of the adjustment mechanism (adjustment mechanism 118). The adjustment mechanism 118 includes a cylindrical cam 118A (first pressing member) and a convex portion 118B. As shown in FIG. 11A, the cylindrical cam 118A is a cylindrical cam having an asymmetrical shape with respect to the center of rotation, and is inserted in a direction orthogonal to the optical axis L from the outside of the outer frame 112 and is rotatable around the direction orthogonal to the optical axis L. Further, the convex portion 118B is a semi-cylindrical member provided on the inner frame 114. As shown in FIG. 11B, the generating line of the cylindrical cam 118A and the generating line of the convex portion 118B intersect to come into point contact with each other.

Adjustment of Pressing Degree Through Rotation of First Pressing Member

Figure 12A:
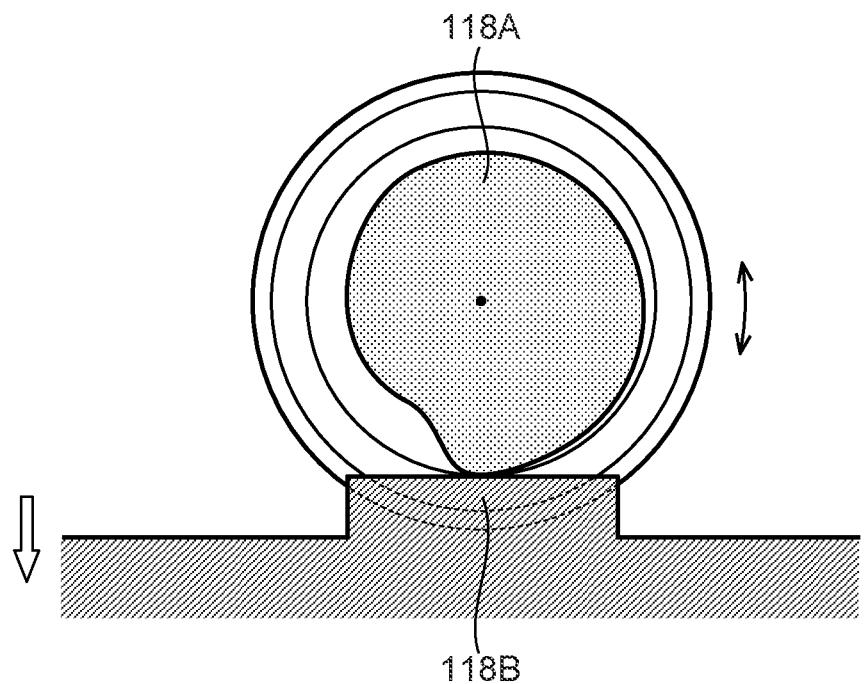
FIGS. 12A and 12B are views showing a state in which a pressing degree is adjusted by the adjustment mechanism.
Figure 12B:
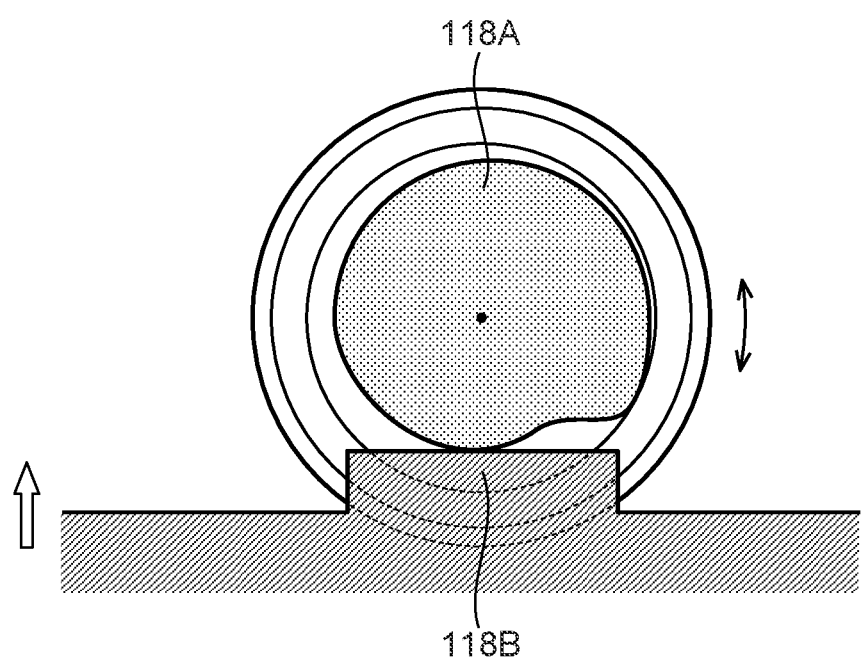

As shown in FIGS. 12A and 12B, the user can change the degree of pressing (pressing degree) the inner frame 114 in the direction of the optical axis L (to the side opposite to the direction of bias) by rotating the cylindrical cam 118A (first pressing member). FIG. 12A shows a state of the maximum pressing degree, and FIG. 12B shows a state of the minimum pressing degree. In this way, the pressing degree is adjusted in the adjustment mechanisms 118 disposed at three locations, whereby the user can adjust the position of the inner frame 114 in the optical axis direction with respect to the outer frame 112 and the tilt (tilt angle) of the inner frame 114 with respect to the direction intersecting the optical axis L.

Another Example of Configuration of Adjustment Mechanism

Figure 13A:
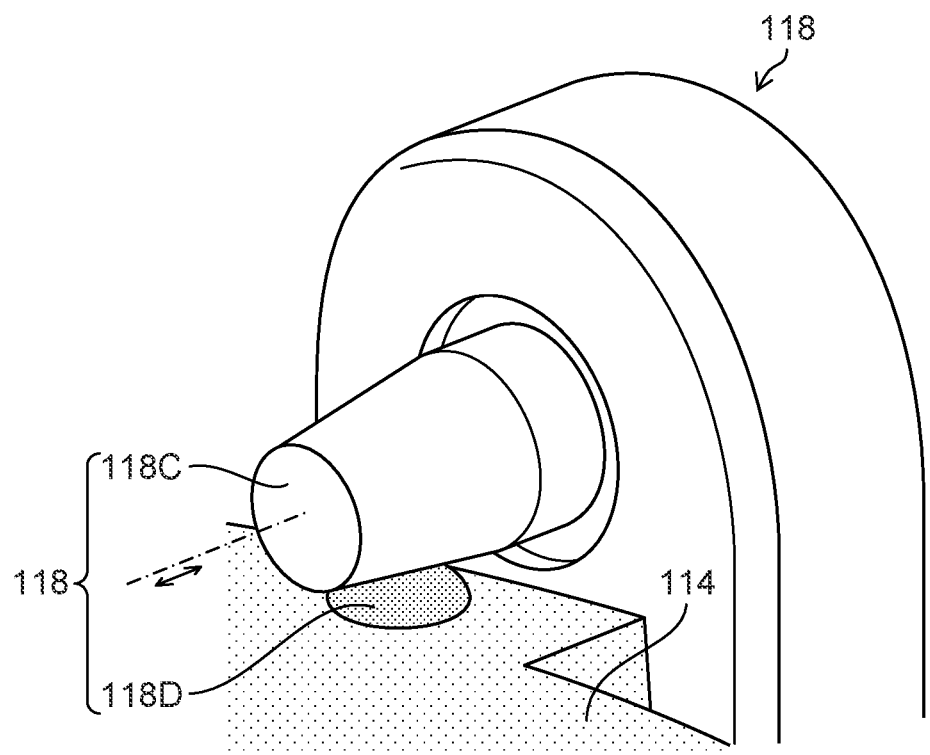
FIGS. 13A and 13B are views showing another example of the configuration of the adjustment mechanism.
Figure 13B:
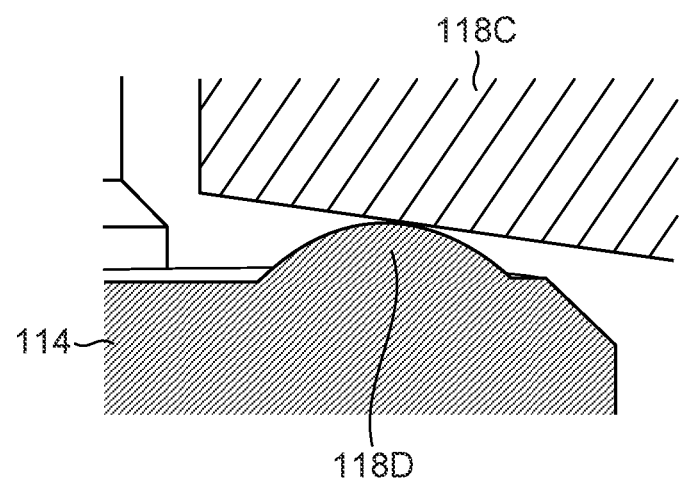

FIGS. 13A and 13B are views showing another example of the configuration of the adjustment mechanism. As shown in FIG. 13A, the adjustment mechanism 118 comprises a taper pin 118C (first pressing member) of which the tip end side is thinner than the base end side, and a convex portion 118D formed on the inner frame 114. The convex portion 118D may be semi-cylindrical, but is preferably hemispherical. As shown in FIG. 13B, the generating line of the taper pin 118C comes into point contact with the convex portion 118D, and the user can adjust the pressing degree in the same manner as in the aspects shown in FIGS. 11A, 11B, 12A, and 12B by inserting and pulling out the taper pin 118C (by moving the taper pin 118C in a direction shown by an arrow).

As shown in the examples of FIGS. 11A to 13B, it is preferable to set the shape of the convex portion (convex portion 118B or 118D) in conformance with the shape of the first pressing member (the cylindrical cam 118A or the taper pin 118C) so that both the convex portion and the first pressing member are brought into point contact with each other. The first pressing member may be an eccentric roller.

Figure 14:
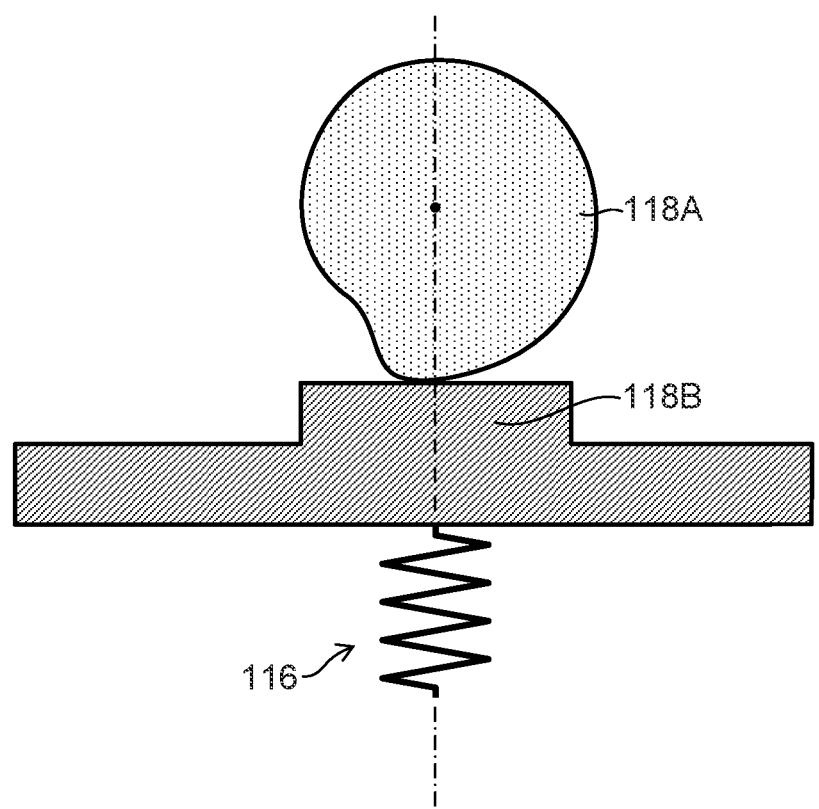
FIG. 14 is a view showing preferable disposition of a first pressing member, a convex portion, and a biasing member.

Preferable Disposition of First Pressing Member, Convex Portion, And Biasing Member FIG. 14 is a view showing preferable disposition of the first pressing member, the convex portion, and the biasing member (examples for the aspects of FIGS. 11A, 11B, 12A, and 12B). As shown in FIG. 14, it is preferable that the biasing spring 116 (biasing member) is disposed below the cylindrical cam 118A (first pressing member) and the convex portion 118B (convex portion) in the optical axis direction (up-down direction in FIG. 14).

Action And Effect of First Optical Adjustment Mechanism

As described above, with the first optical adjustment mechanism 110 according to the first embodiment, the user can adjust the position and/or the tilt (tilt angle) of the optical element. The user may fix the adjustment mechanism 118 and/or the axial deviation suppression portion 120 with an adhesive, a resin (for example, a resin that is cured by light, electromagnetic waves, or heat), or the like after adjusting the position and/or the tilt.

Fixation of Members with Adhesive and so on

An adhesive, a resin and so on may have a large curing shrinkage depending on materials thereof. In a case where the members constituting the first optical adjustment mechanism are fixed with the adhesive, the resin and so on, there may be a case where the relative position between the inner frame and the outer frame is unintentionally changed due to the curing shrinkage. In this case, the first embodiment can fix members in the following manner.

Figure 15A:
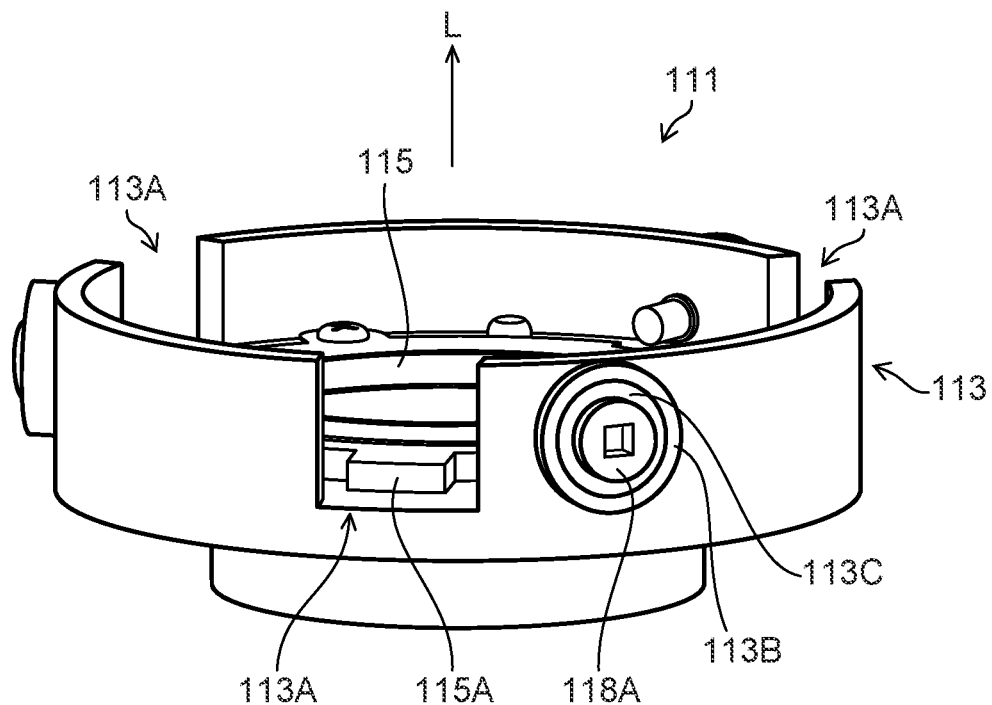
FIGS. 15A and 15B are views showing another example of the first optical adjustment mechanism.
Figure 15B:
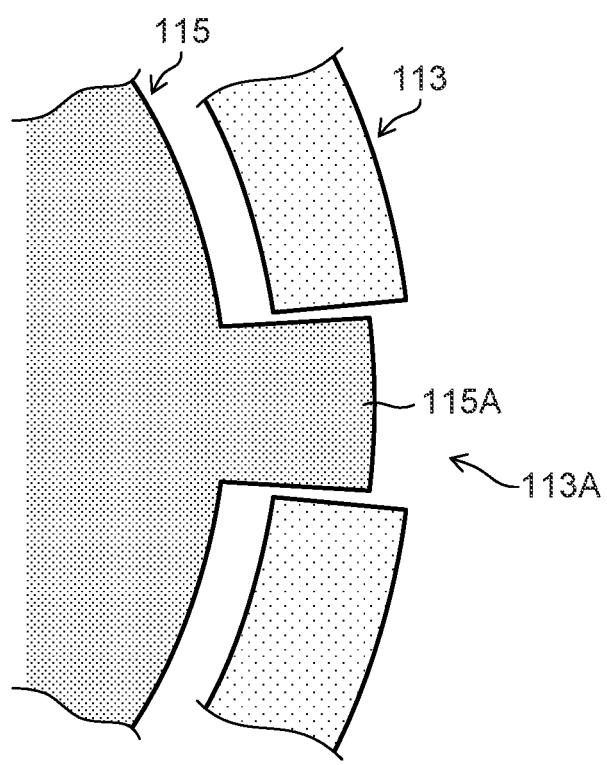

FIGS. 15A and 15B are views showing a first optical adjustment mechanism 111 (optical adjustment mechanism) in an assembled state. As shown in FIG. 15A, the first optical adjustment mechanism 111 includes an outer frame 113 (outer frame) and an inner frame 115 (inner frame). On the outer frame 113, window portions 113A and edge portions 113B are formed. A groove portion 113C is formed between each edge portion 113B and a head portion of each cylindrical cam 118A. Further, protruding portions 115A are formed on the inner frame 115, and each protruding portion 115A can be inserted into each window portion 113A. On the other hand, FIG. 15B is a partial view showing the first optical adjustment mechanism 111 in a state where the protruding portion 115A is inserted into the window portion 113A, viewed from the front side (subject side) in the direction of the optical axis L. Preferably, an end surface of the protruding portion 115A and an outer peripheral surface of the outer frame 113 are on the same plane, or the end surface of the protruding portion 115A is recessed (does not protrude from the outer peripheral surface of the outer frame 113) toward the center of optical axis. The window portions 113A and the protruding portions 115A are formed at three positions in the circumferential direction of the outer frame 113 and the inner frame 115. In other respects, the first optical adjustment mechanism 111 has the same configuration as that of the first optical adjustment mechanism 110.

Example of Fixing Method

Figure 16A:
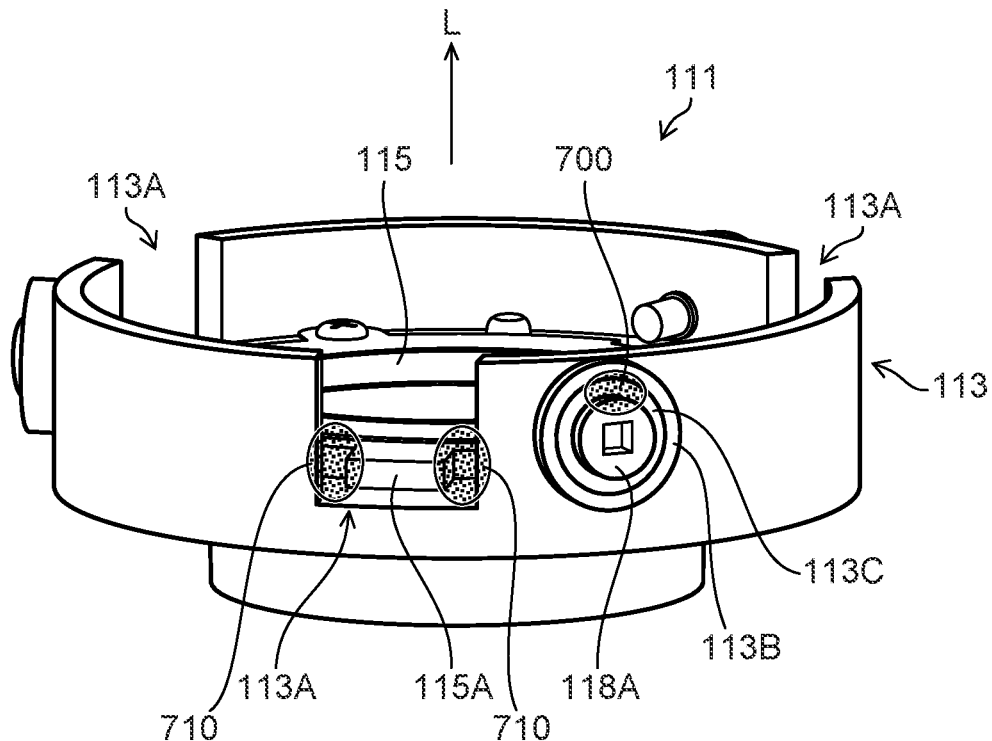
FIGS. 16A and 16B are views showing the first optical adjustment mechanism by adhesion in a fixed state.
Figure 16B:
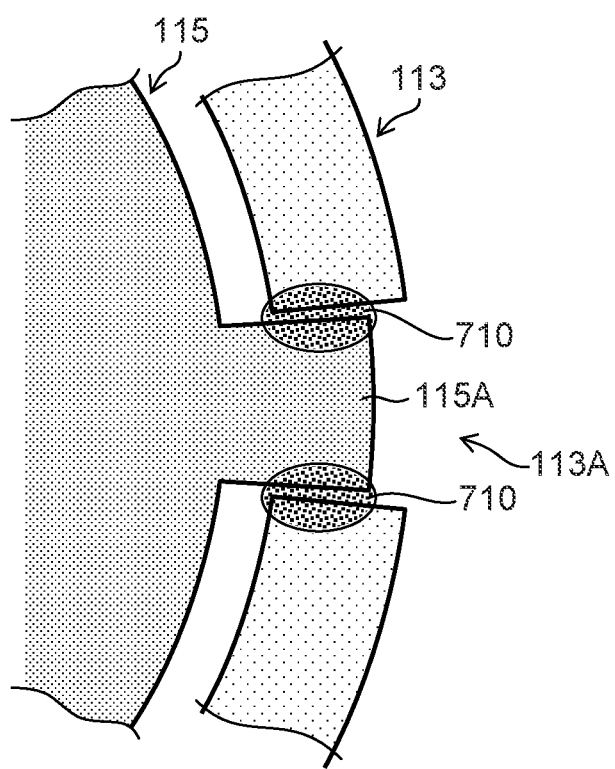

FIGS. 16A and 16B are views showing an example of a fixing method of members. In the example shown in FIG. 16A, in a case where the cylindrical cum 118A (first pressing member) is fixed, for example, a UV curable adhesive may be applied to the groove portion 113C (fixing region 700 in the example shown in FIG. 16A). Here, this fixation aims to fix the rotation position of the cylindrical cum 118A. Because the positions of members are not affected by the curing shrinkage of the adhesive, a type of the adhesive and fixing positions do not cause any problem.

On the other hand, in a case where the inner frame 115 and the outer frame 113 are fixed to each other, it is preferable that an influence of curing shrinkage of the adhesive and the resin be considered. Specifically, because a UV curing adhesive has a large curing shrinkage force, in a case where the UV curing adhesive is used, it is preferable that the UV curing adhesive be applied not to a surface direction along the optical axis L, but to a surface direction perpendicular to the optical axis L. More specifically, as shown in FIG. 16A and FIG. 16B (partial view similar to FIG. 15B), the UV curing adhesive may be applied to a gap (gaps) between the protruding portion 115A and the window portion 113A, for example, two fixing regions 710. Note that the two fixing regions 710 are on a surface perpendicular to the optical axis L.

In the first optical adjustment mechanism 111, because the above described fixing method does not cause curing shrinkage in the direction of the optical axis L, it is possible to suppress the position change of the inner frame 115 relative to the outer frame 113.

Another Example of Fixing Method

Figure 17:
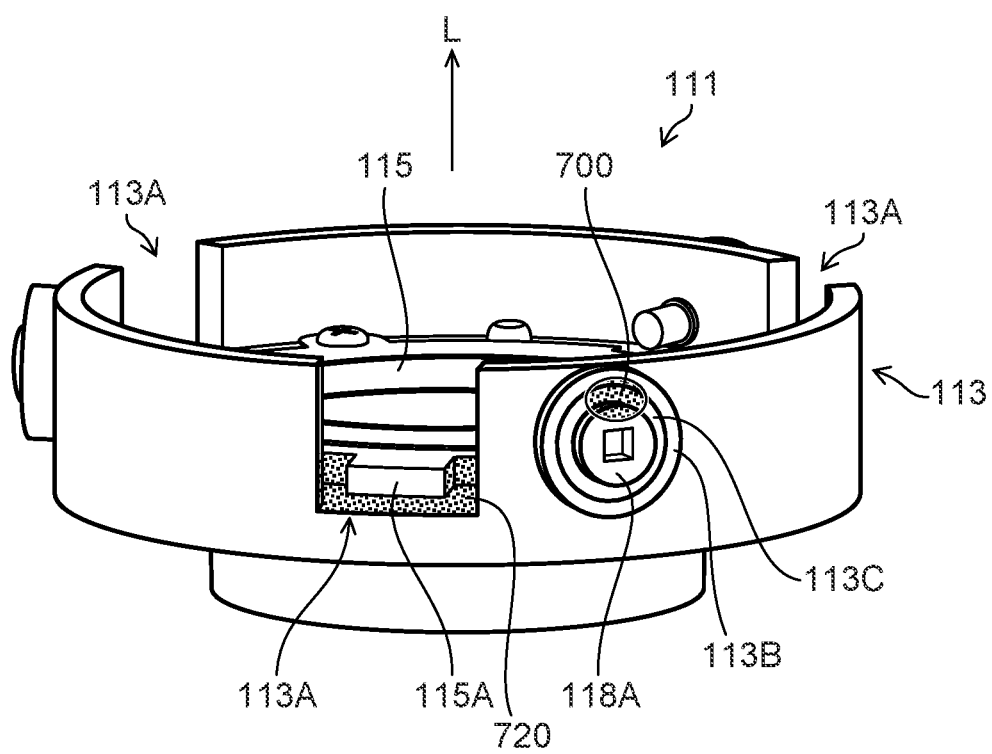
FIG. 17 is another view showing a state of fixation of the first optical adjustment mechanism by adhesion.

FIG. 17 is a view showing another example of the fixing method of members. The cylindrical cum 118A may be fixed in a similar manner to the method explained about FIGS. 15A and 15B. Regarding the fixation of the inner frame 115 and the outer frame 113, in the example shown in FIG. 17, a screw locking agent (for example, ThreeBond 1401C (trade name)) having a curing shrinkage force smaller than a biasing force of the biasing spring (biasing member) 116 is applied to the gap between the protruding portion 115A and the window portion 113A (fixing region 720 shown in FIG. 17). Thus, it is possible to reduce influence on relative position between members also in a case where an agent having a small curing shrinkage force is used.

Overall Configuration of Second Optical Adjustment Mechanism

Figure 19B:
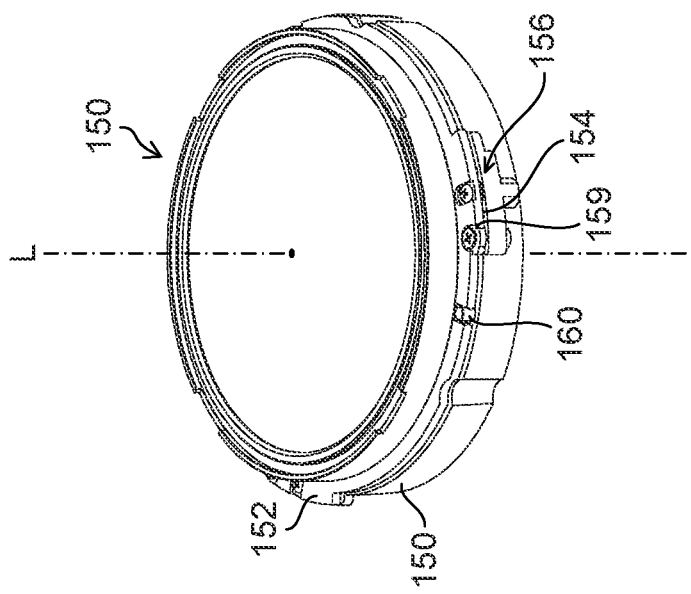
FIGS. 19A and 19B are views showing a front view and a perspective view of the second optical adjustment mechanism (assembled state), respectively.
Figure 19A:
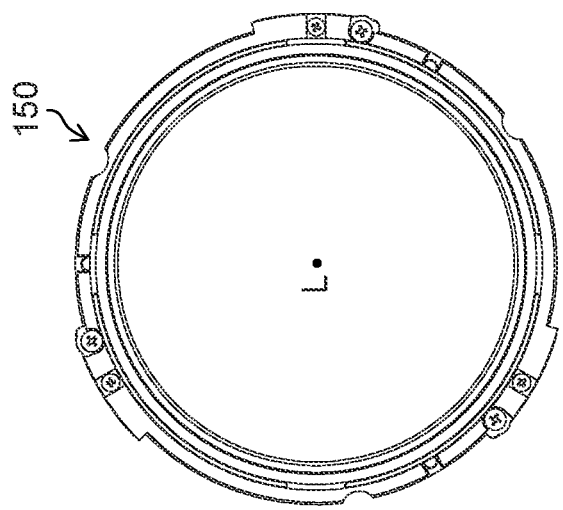

FIG. 18 is an exploded perspective view showing the overall configuration of a second optical adjustment mechanism 150 (optical adjustment mechanism). Further, FIGS. 19A and 19B are a front view and a perspective view of the second optical adjustment mechanism 150 (assembled state), respectively. As described above, the second optical adjustment mechanism 150 is a mechanism that is used to adjust the position and/or the tilt of the optical element (lens or the like) in the opening end (on the subject side) of the lens device 100. As shown in FIGS. 18, 19A, and 19B, the second optical adjustment mechanism 150 comprises an outer frame 151 (outer frame), an inner frame 152 (inner frame) held by the outer frame 151 and holding the optical element (not shown), a biasing spring 154 (biasing member), an adjustment mechanism 156 (adjustment mechanism), an axial deviation suppression portion 160 (axial deviation suppression portion), and a spring bias stopper 159 (stopper).

The inner frame 152 is held by the outer frame 151 and holds the optical element (not shown), and the axial deviation suppression portion 160 suppresses the deviation of the inner frame 152 in the optical axis direction with respect to the outer frame 151, as in the first optical adjustment mechanism 110.

Figure 20:
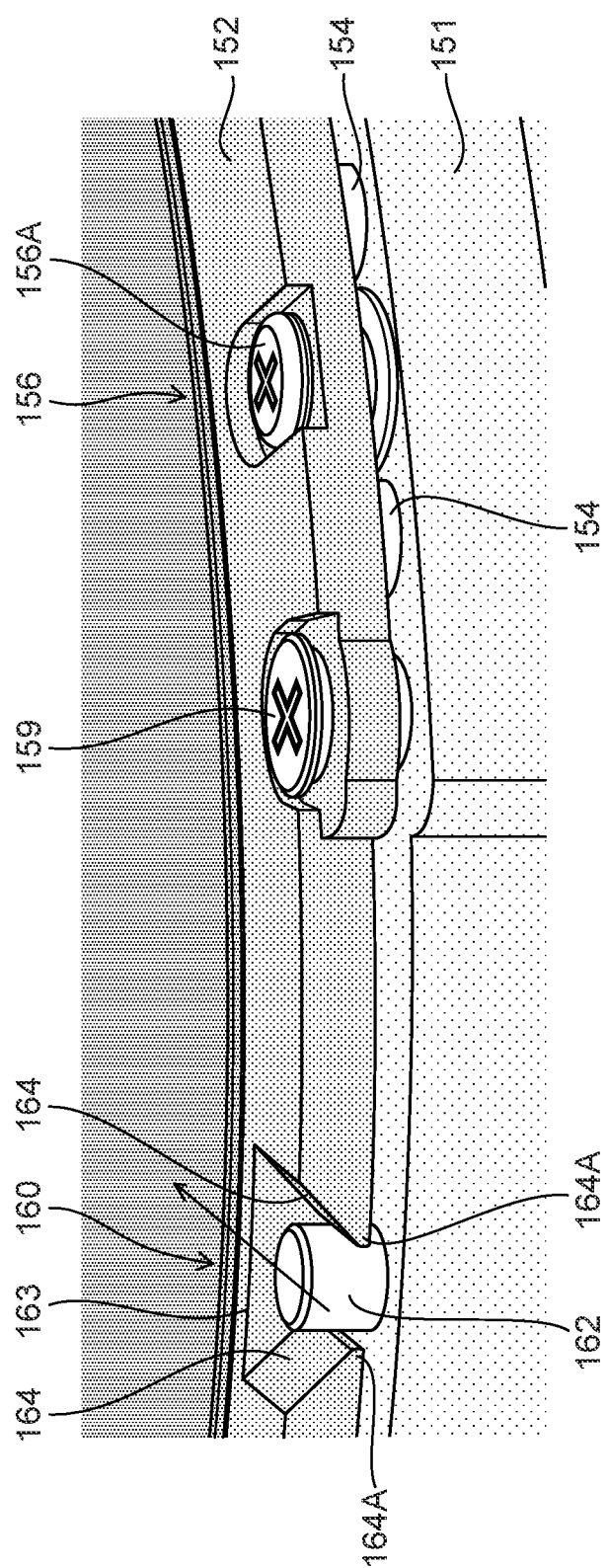
FIG. 20 is a partially enlarged view of the second optical adjustment mechanism.

FIG. 20 is a partially enlarged view of the second optical adjustment mechanism 150 (a part where the axial deviation suppression portion 160, the biasing spring 154, the spring bias stopper 159, the adjustment mechanism 156, and the like are present). The adjustment mechanism 156 comprises an adjustment screw 156A (second pressing member) that is inserted and pulled out in the optical axis direction. Point contact between the adjustment screw 156A and the outer frame 151 is not essential, but it is preferable to, for example, provide a hemispherical protrusion on the outer frame 151 or process the end part of the adjustment screw 156A into a hemispherical shape (provide a convex portion) so that the adjustment screw 156A and the outer frame 151 are brought into point contact with each other. The biasing springs 154 (two at three locations; six in total) are disposed on both sides of the adjustment mechanism 156 in the circumferential direction. The biasing spring 154 is disposed around the outer frame 151 and biases the inner frame 152 in the optical axis direction of the optical element. The spring bias stopper 159 is screwed in the optical axis direction and fixed to the outer frame 151, and restricts the inner frame 152 from falling off in the optical axis direction due to the bias.

Configuration of Axial Deviation Suppression Portion

Figure 21:
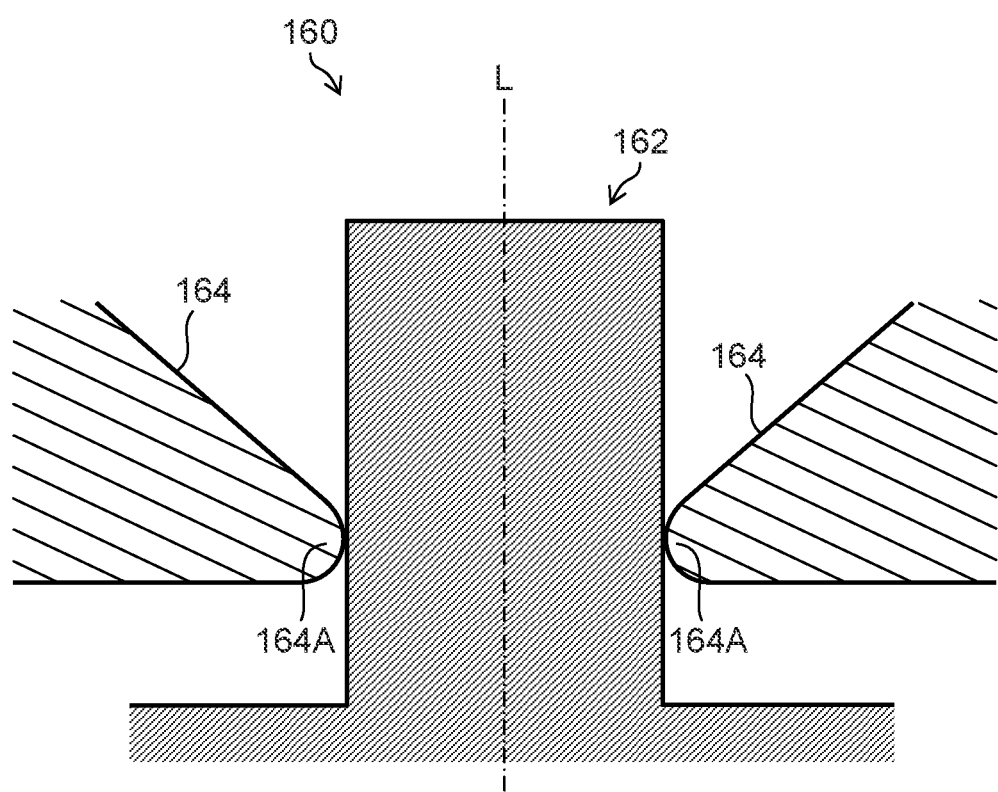
FIG. 21 is a cross-sectional view showing a configuration of an axial deviation suppression portion.

In the second optical adjustment mechanism 150, the axial deviation suppression portion 160 comprises a protruding portion 162 protruding from the outer frame 151 and a groove portion 163 (a contact portion that comes into contact with the protruding portion 162) that is formed in a direction of the optical axis center (an arrow direction passing through the protruding portion 162 in FIG. 20) from the outer peripheral portion of the inner frame 152 and that receives the protruding portion 162. FIG. 21 is a cross-sectional view showing the configuration of the axial deviation suppression portion 160. The groove portion 163 (the contact portion and the groove portion) is provided with semi-cylindrical (semi-circular cross-section) protrusions 164A at the tip ends of an inner peripheral surface 164, and the outer peripheral surface (arc surface) of the protruding portion 162 and the protrusions 164A (arc surface) intersect to come into point contact with each other at two points. It is preferable that one or more groove portions 163 (the contact portion and the groove portion) are disposed in each of three regions formed by dividing the plane orthogonal to (intersecting) the optical axis L into three equal parts (see FIG. 6), as in the first optical adjustment mechanism 110.

In the second optical adjustment mechanism 150 having the above-described configuration, the user can also adjust the pressing degree of the inner frame 152 by screwing (inserting and pulling out) the adjustment screw 156A (second pressing member) in the direction of the optical axis L and adjust the position of the inner frame 152 in the optical axis direction and the tilt (tilt angle) of the inner frame 152 in the direction orthogonal to (intersecting) the optical axis L according to this adjustment, as in the first optical adjustment mechanism 110. The user may fix the adjustment mechanism 156 and/or the axial deviation suppression portion 160 with an adhesive or a resin after the adjustment.

Similar to the explanation about the first optical adjustment mechanism, also in the second optical adjustment mechanism 150, it is preferable to suppress change of relative position between members due to curing shrinkage of the adhesive or the resin. Specifically, in a case where a UV curing adhesive or the like having a large curing shrinkage is used, the adhesive or the like is not applied to a gap between the inner frame 152 and the outer frame 151. Instead, the adhesive or the like may be applied to a gap (gaps) between the adjustment screw 156A (second pressing member) and the inner frame 152, or a gap (gaps) between the protruding portion 162 and the inner peripheral surface 164 of the axial deviation suppression portion 160. On the other hand, in a case where a screw locking agent or the like having a small curing shrinkage is used, the adhesive may be applied to the gap (gaps) between the inner frame 152 and the outer frame 151.

Further, in the second optical adjustment mechanism 150, since the adjustment screw 156A is screwed in the optical axis direction, the diameter can be made smaller than that of the first optical adjustment mechanism in which the cylindrical cam 118A or the taper pin 118C (first pressing member) is inserted and pulled out in the direction orthogonal to (intersecting) the optical axis L.

The embodiment of the present invention has been described above, but the present invention is not limited to the above-described aspects, and various modifications can be made without departing from a spirit of the present invention.

APPENDIX

Optical Adjustment Mechanism Adjusting Shift Amount

In addition to the above-described embodiment, the following optical adjustment mechanisms are also included in the scope of the present invention. The optical adjustment mechanism described in "Appendix" is an optical adjustment mechanism that is used to adjust a shift amount (positional deviation) in a plane orthogonal to (intersecting) the optical axis of the optical element.

Appendix 1

An optical adjustment mechanism comprising:
an outer frame;
an inner frame that is held by the outer frame and holds an optical element;
a biasing member that is disposed around the outer frame and biases the inner frame in a direction intersecting an optical axis of the optical element;
a position adjustment member that is disposed around the outer frame, is inserted and pulled out in the direction, and presses the inner frame in a direction opposite to a direction of the bias;
a position restriction portion that is disposed around the outer frame and restricts a position of the inner frame in a direction of the optical axis; and
a pivot portion that suppresses a tilt of the inner frame with respect to the outer frame and acts as a fulcrum in a case where the inner frame is rotated around the optical axis with respect to the outer frame,
in which the pivot portion includes a protruding portion disposed on the outer frame and protruding in the direction orthogonal to the optical axis, and a contact portion formed in the inner frame corresponding to the protruding portion and coming into contact with the protruding portion.

Appendix 2

The optical adjustment mechanism according to Appendix 1, in which an outer peripheral surface of the protruding portion and a contact surface of the contact portion come into line contact with each other.

Appendix 3

The optical adjustment mechanism according to Appendix 2, in which the outer peripheral surface of the protruding portion and the contact surface of the contact portion come into line contact with each other with two lines.

Appendix 4

The optical adjustment mechanism according to Appendix 2 or 3, in which the protruding portion has a cylindrical portion, and a side surface of the cylindrical portion comes into line contact with the contact surface, as the outer peripheral surface.

Appendix 5

The optical adjustment mechanism according to any one of Appendixes 2 to 4, in which the outer peripheral surface is an arc surface, and the outer peripheral surface and the contact surface come into line contact with each other.

Appendix 6

The optical adjustment mechanism according to any one of Appendixes 2 to 5, in which the contact portion is a groove portion having an inner peripheral surface as the contact surface.

Appendix 7

The optical adjustment mechanism according to any one of Appendixes 1 to 6, in which the biasing members are disposed at two or more locations of the outer frame around the optical axis.

Appendix 8

The optical adjustment mechanism according to Appendix 7, in which the pivot portion is disposed close to one of two biasing members rather than in the middle of the two biasing members.

Appendix 9

The optical adjustment mechanism according to any one of Appendixes 1 to 8, in which the position adjustment member is disposed so as to face the biasing member with the optical axis interposed therebetween.

Appendix 10

The optical adjustment mechanism according to any one of Appendixes 1 to 9, in which the inner frame includes a plurality of protruding portions corresponding to the position adjustment members, and the position adjustment member comes into line contact with the protruding portion.

Appendix 11

The optical adjustment mechanism according to any one of Appendixes 1 to 10, in which the position adjustment member is a columnar member that is inserted and pulled out in the direction orthogonal to the optical axis, and has a columnar member of which one end surface is a plane,
a semi-cylindrical convex portion extending in the direction of the optical axis is formed on the protruding portion, and
the plane of the position adjustment member comes into line contact with the convex portion of the protruding portion.

Appendix 12

The optical adjustment mechanism according to any one of Appendixes 1 to 11, in which the outer frame includes a window portion expanding in the direction of the optical axis and the circumferential direction of the optical axis,
the inner frame includes a shaft portion extending in the direction orthogonal to the optical axis from a main body of the inner frame, and
the shaft portion is inserted into the window portion, and movement of the shaft portion is restricted to the inside of the window portion so that movement of the inner frame in the direction of the optical axis with respect to the outer frame is restricted to a range of the expansion of the window portion in the direction of the optical axis and rotation of the inner frame around the optical axis is restricted to a range of the expansion of the window portion in the circumferential direction.

Configuration of Third Optical Adjustment Mechanism

Figure 22:
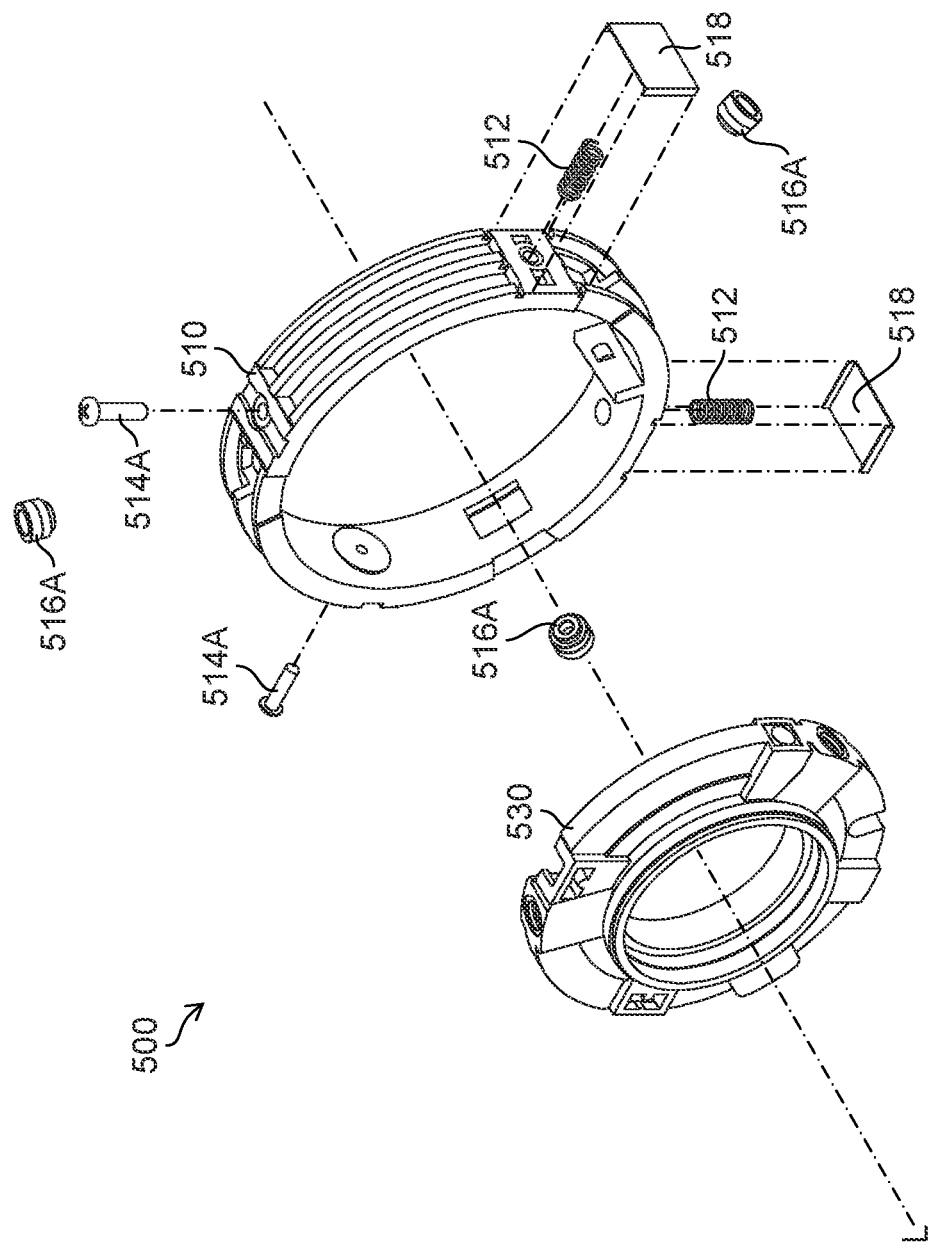
FIG. 22 is an exploded perspective view showing a configuration of a third optical adjustment mechanism.
Figure 23:
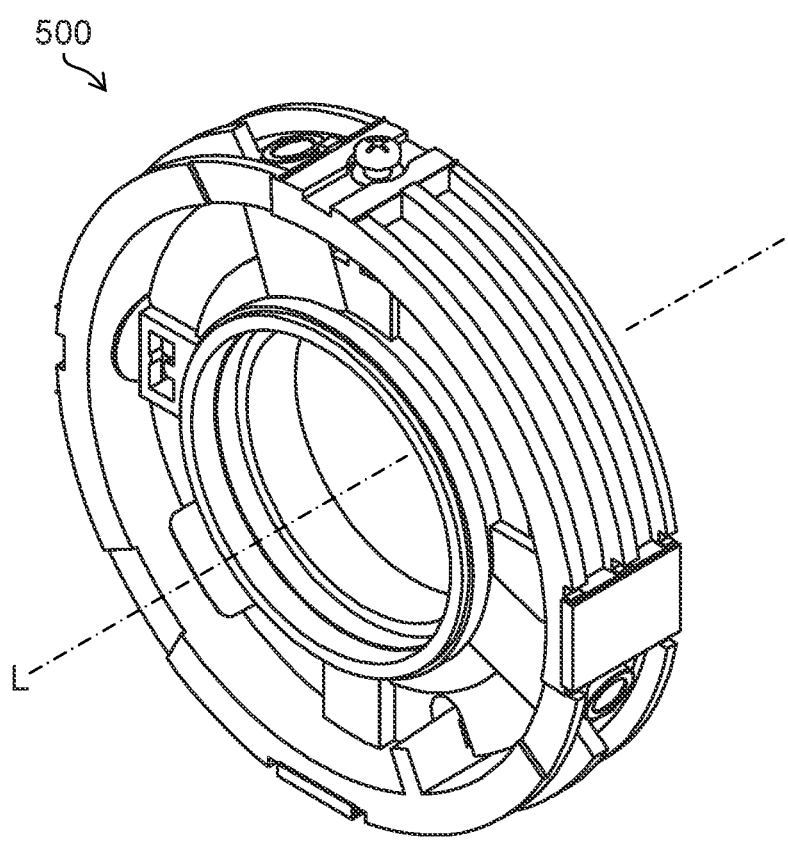
FIG. 23 is a perspective view of the third optical adjustment mechanism (assembled state).
Figure 24B:
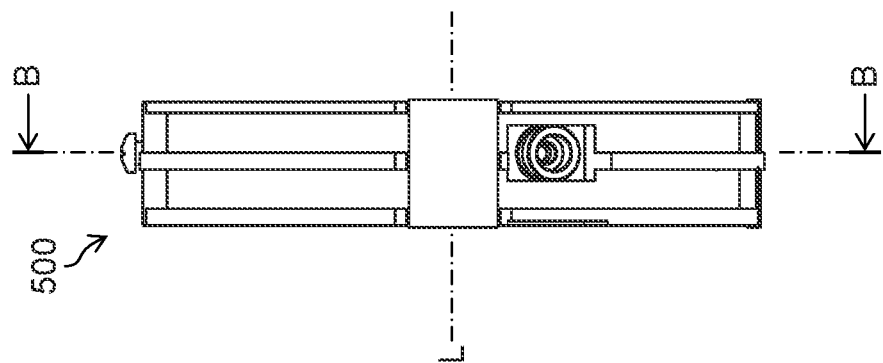
FIGS. 24A and 24B are a front view and a side view of the third optical adjustment mechanism (assembled state), respectively.
Figure 24A:
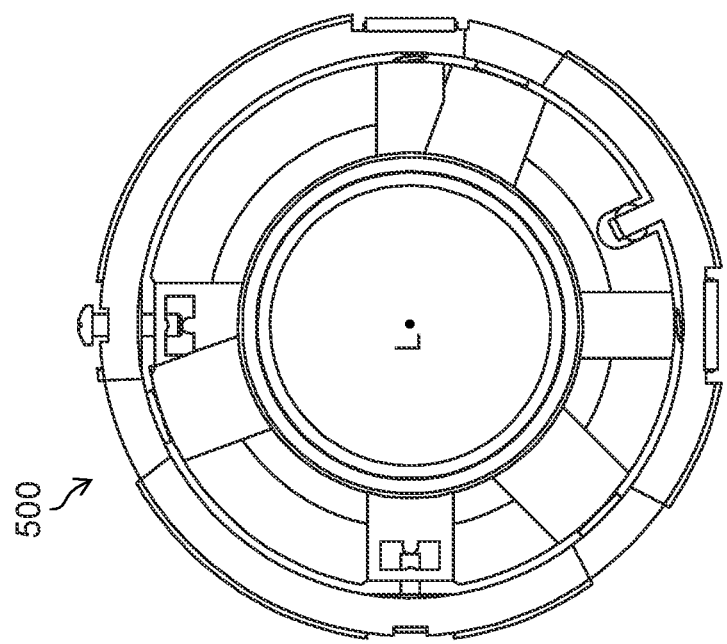
Figure 25:
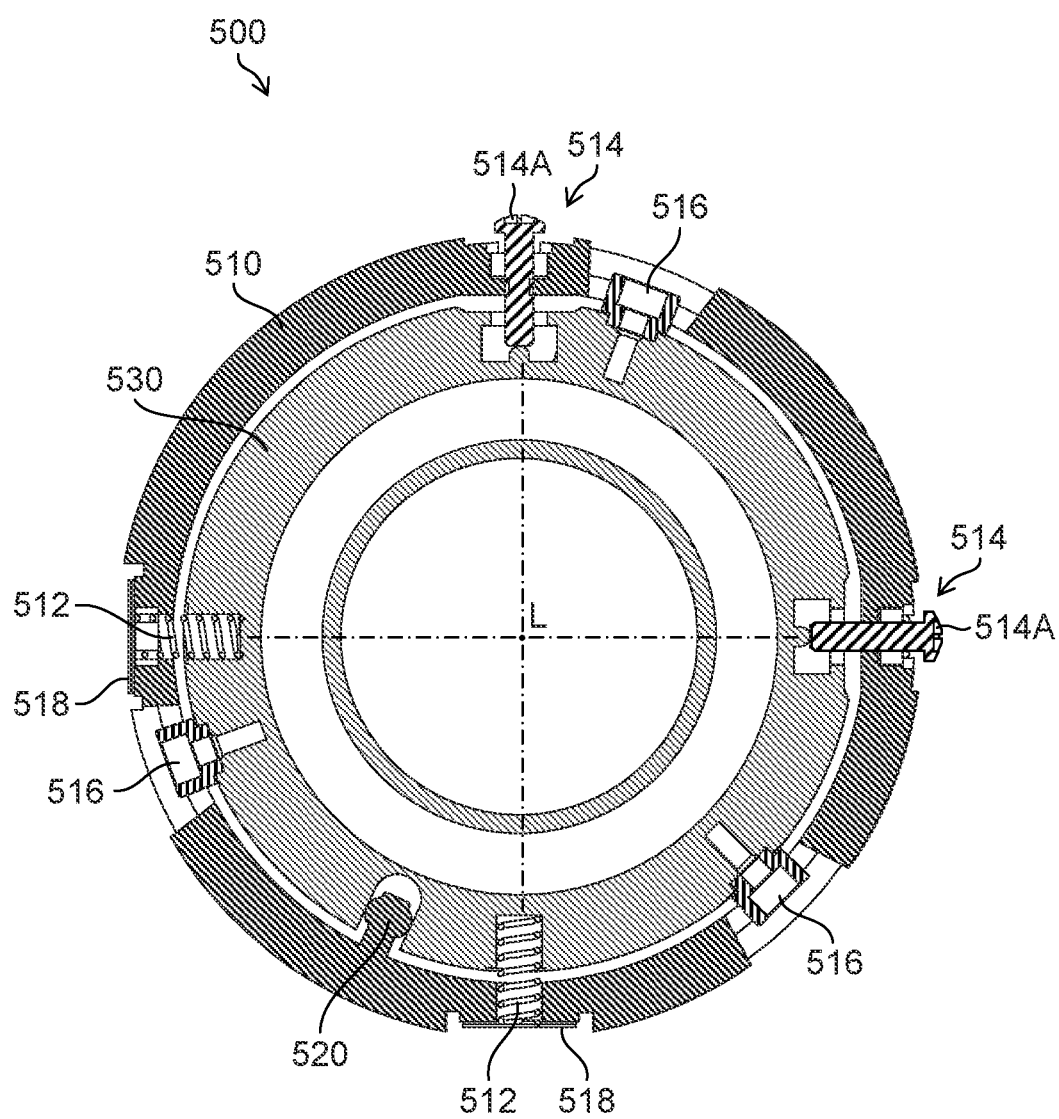
FIG. 25 is a cross-sectional view of the third optical adjustment mechanism (assembled state).

FIG. 22 is an exploded perspective view of a third optical adjustment mechanism 500 (optical adjustment mechanism) according to the configuration of Appendix, and FIGS. 23 to 25 are a perspective view, a front view, a side view, and a cross-sectional view of the third optical adjustment mechanism 500 (assembled state), respectively. As shown in FIGS. 22 to 25, the third optical adjustment mechanism 500 comprises an outer frame 510 (outer frame, fixed frame); an inner frame 530 (inner frame) that is held by the outer frame 510 and holds an optical element (not shown), such as a lens; biasing springs 512 (biasing member) that are disposed at two locations (a plurality of locations) of the outer frame 510 around the optical axis L and bias the inner frame 530 in a direction orthogonal to (intersecting) an optical axis of the optical element; adjustment mechanisms 514 (including the adjustment screws 514A; position adjustment member) disposed at two locations of the outer frame 510 (a plurality of locations) around the optical axis L, each of which is inserted and pulled out in the direction orthogonal to the optical axis L and presses the inner frame 530 in a direction opposite to a direction of the bias performed by the biasing spring 512; inner frame restriction portions 516 (position restriction portion, rotation restriction portion) that are disposed at three locations (a plurality of locations) of the outer frame 510 around the optical axis L and restrict a position of the inner frame 530 in a direction of the optical axis L and rotation of the inner frame 530 around the optical axis L; and a pivot portion 520 (pivot portion) that suppresses a tilt of the inner frame 530 with respect to the outer frame 510 and acts as a fulcrum in a case where the inner frame 530 is rotated around the optical axis L with respect to the outer frame 510.

Bias Performed by Biasing Spring

Figure 26:
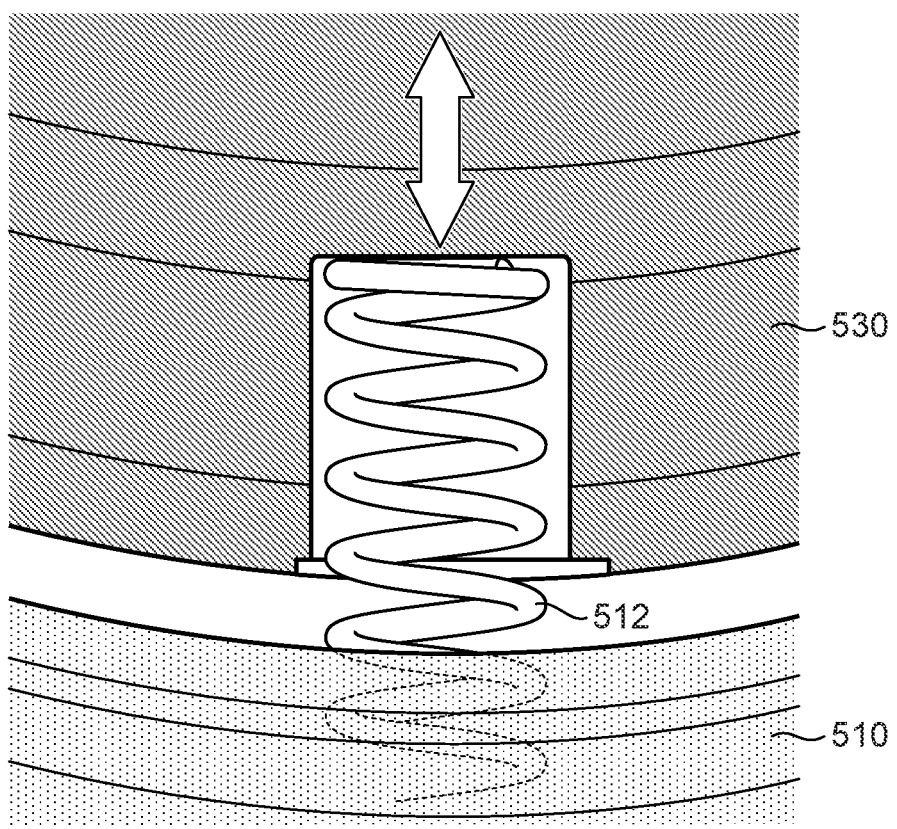
FIG. 26 is a view showing a biased state by a biasing spring.

FIG. 26 is a view showing a state in which the biasing spring 512 (the biasing member) biases the inner frame 530 in the direction orthogonal to (intersecting) the optical axis L (in an arrow direction in FIG. 26). As shown in FIGS. 22 and 25, a spring bias stopper 518 that prevents the biasing spring 512 from falling out is disposed on the outer side (outer peripheral side) of the biasing spring 512.

Configuration of Adjustment Mechanism

Figure 27:
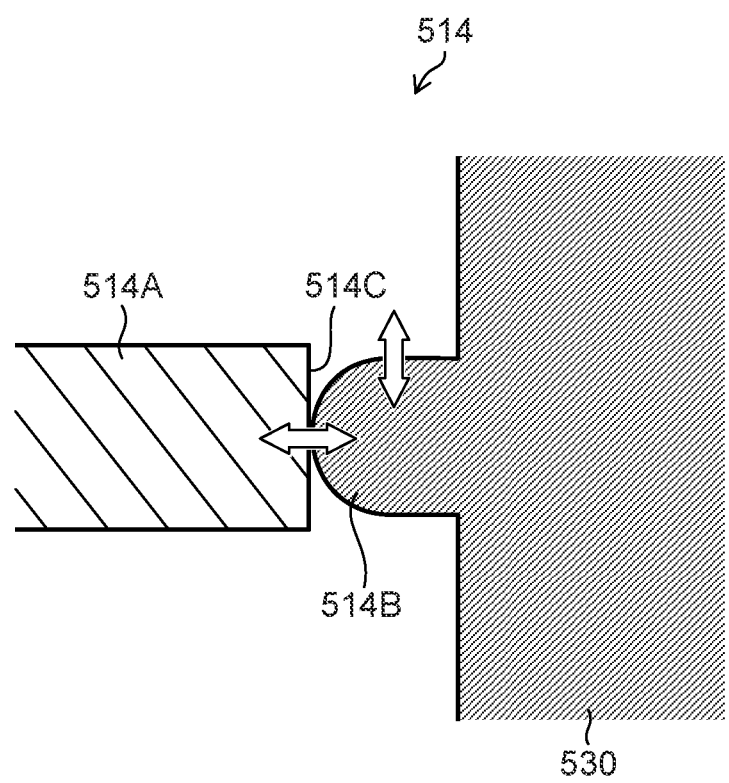
FIG. 27 is a view showing a configuration of an adjustment mechanism.

FIG. 27 is a view showing the configuration of the adjustment mechanism 514 (adjustment mechanism, position adjustment member). The adjustment mechanism 514 comprises the adjustment screw 514A (position adjustment member) and a protruding portion 514B formed on the inner frame 530. The adjustment screw 514A is a columnar member inserted and pulled out in the direction orthogonal to (intersecting) the optical axis L (left-right direction in FIG. 27), and one end surface thereof is a plane 514C. Further, the protruding portion 514B is a semi-cylindrical convex portion extending in the direction of the optical axis L (direction orthogonal to the paper surface), and the plane 514C of the adjustment screw 514A and the convex portion of the protruding portion 514B come into line contact with each other. As shown in FIGS. 22, 25, and the like, the biasing spring 512 and the adjustment mechanism 514 are provided so as to face each other with the optical axis L interposed therebetween. The user can adjust the position of the inner frame 530 in the plane orthogonal to (intersecting) the optical axis by inserting and pulling out the adjustment screws 514A disposed at two locations (the adjustment screw 514A is inserted and pulled out to move the inner frame 530 in the up-down direction of FIG. 26). In FIG. 27, linear double-headed arrows indicate directions in which the adjustment screw 514A and the inner frame 530 can be moved.

Configuration of Pivot Portion

Figure 28:
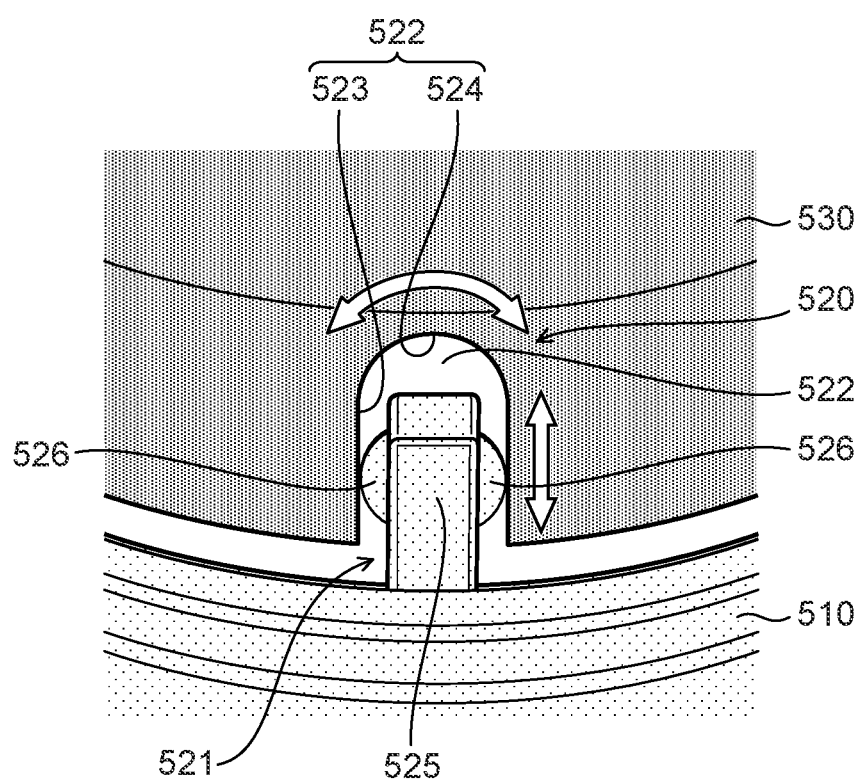
FIG. 28 is a view showing a configuration of a pivot portion.
Figure 29:
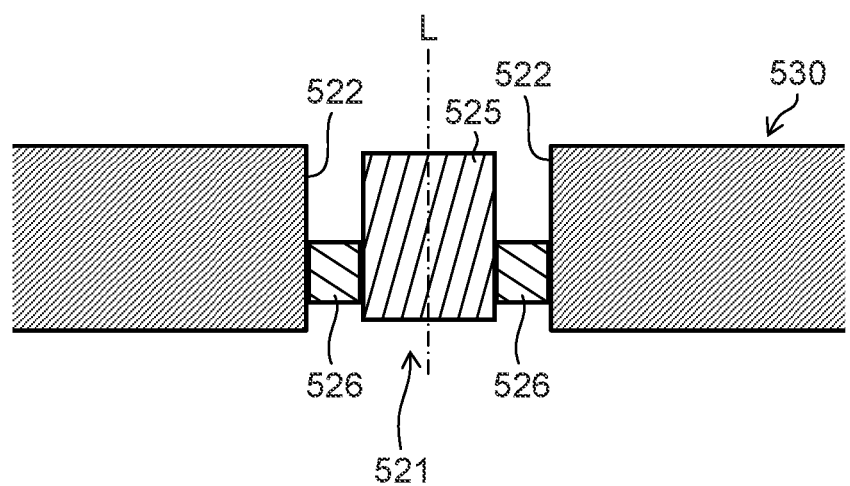
FIG. 29 is a cross-sectional view schematically showing a state of line contact in the pivot portion.

FIG. 28 is a view showing the configuration of the pivot portion 520 (a state seen from the direction of the optical axis L). The pivot portion 520 comprises a protruding portion 521 disposed on the outer frame 510 and protruding in the direction orthogonal to (intersecting) the optical axis L, and a contact portion 522 formed in the inner frame 530 corresponding to the protruding portion 521 and coming into contact with the protruding portion 521. The protruding portion 521 has an arm 525 extending from the outer frame 510 and semi-cylindrical cylindrical portions 526 (cylindrical portion) formed on both sides of a tip end part of the arm 525, and a side surface (outer peripheral surface) of the cylindrical portion 526 is an arc surface. Meanwhile, the contact portion 522 is a groove portion provided with an inner peripheral surface 523 as a contact surface (an arc surface 524 is formed on the deep side (the inner peripheral side) of the groove portion). Then, the two cylindrical portions 526 of the protruding portion 521 and the inner peripheral surface 523 of the contact portion 522 come into line contact with each other (line contact with two lines). FIG. 29 is a cross-sectional view schematically showing a state of line contact in the pivot portion 520 (a state in which the cylindrical portions 526 and the inner peripheral surface 523 come into line contact with each other).

The pivot portion 520 having such a configuration suppresses the tilt of the inner frame 530 in the direction intersecting the optical axis L with respect to the outer frame 510, and serves as a fulcrum in a case where the inner frame 530 is rotated around the optical axis L (in the plane intersecting the optical axis L) (in FIG. 28, linear and arc-shaped double-headed arrows indicate the movement direction and the rotation direction of the inner frame 530 with respect to the outer frame 510, respectively). The pivot portion 520 is disposed close to one of two biasing springs 512 (biasing member) rather than in the middle of the two biasing springs 512 in the circumferential direction. Specifically, as shown in FIG. 25, the pivot portion 520 is disposed close to the biasing spring 512 shown at the lower end of FIG. 25. With this, the inner frame 530 is pressed to one side, and rattling with the outer frame 510 can be suppressed.

State of Position Restriction and Rotation Restriction of Inner Frame

Figure 30:
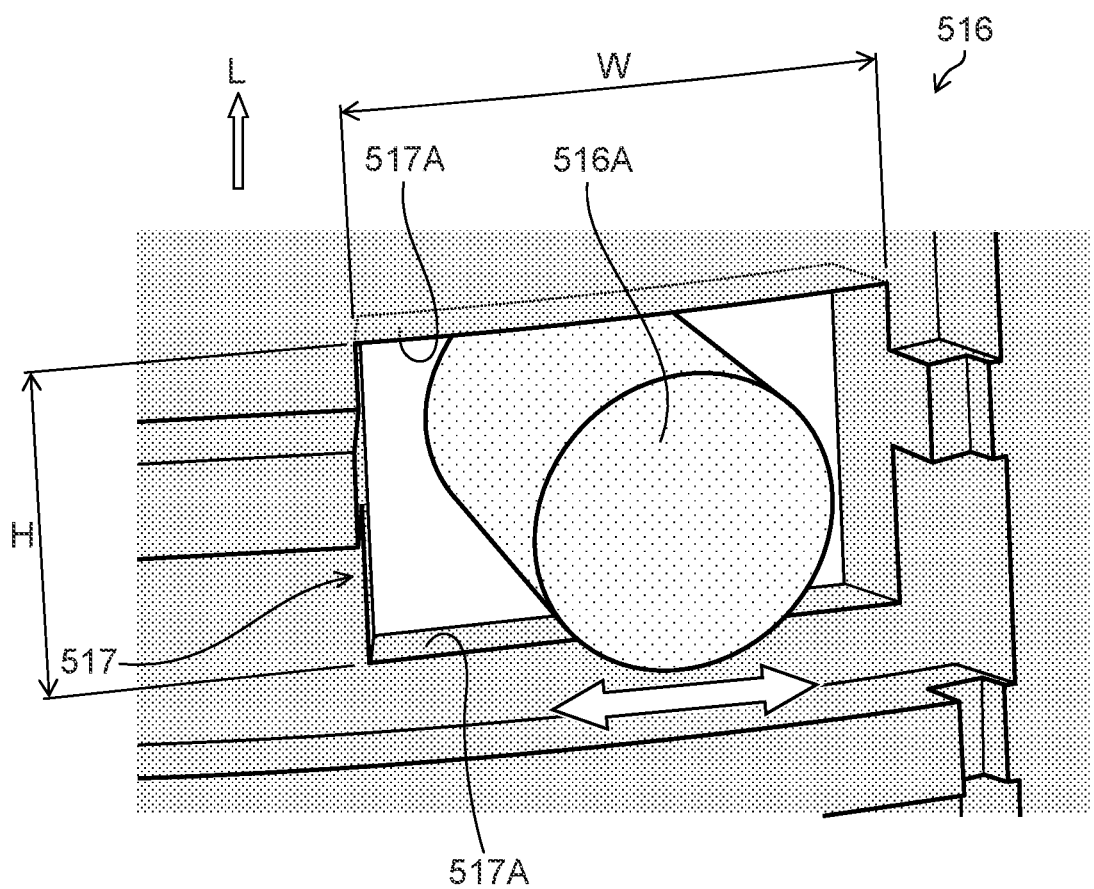
FIG. 30 is a view showing a configuration of an optical axis direction position restriction portion.

FIG. 30 is a partial perspective view showing a state of position restriction and rotation restriction of the inner frame 530. The outer frame 510 comprises a window portion 517 expanding in the direction of the optical axis L (height H) and the circumferential direction of the optical axis L (width W), and the inner frame 530 comprises a shaft portion 516A extending in the direction orthogonal to the optical axis L from the main body of the inner frame 530. The shaft portion 516A is inserted into the window portion 517, and the movement of the shaft portion 516A is restricted to the inside of the window portion 517. The shaft portion 516A and the window portion 517 constitute the inner frame restriction portion 516. Specifically, the movement of the inner frame 530 in the direction of the optical axis L with respect to the outer frame 510 is restricted to the range (the range of the height H in FIG. 30) of expansion of the window portion 517 in the direction of the optical axis L, and the rotation of the inner frame 530 with respect to the outer frame 510 (rotation around the optical axis L) is restricted to the range of the expansion of the window portion 517 (the range of the width W in FIG. 30). The shaft portion 516A slides on an edge portion 517A of the window portion 517.

Figure 31:
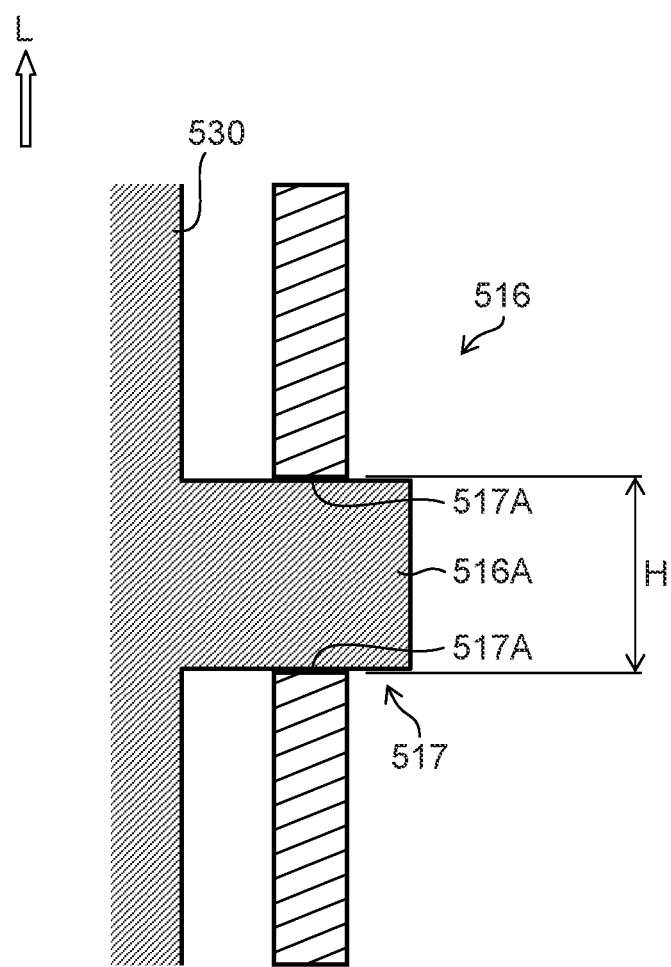
FIG. 31 is another view showing the configuration of the optical axis direction position restriction portion.

FIG. 31 is a view showing a state in which the position of the inner frame 530 (shaft portion 516A) in the optical axis direction is restricted by the window portion 517. The diameter (height H or less) of the shaft portion 516A can be determined according to the allowable amount of movement in the optical axis direction.

In the third optical adjustment mechanism 500 having the above-described configuration, the adjustment mechanism 514 and/or the inner frame restriction portion 516 may be fixed with an adhesive or the like after the inner frame 530 is adjusted, as in the first optical adjustment mechanism 110 and the second optical adjustment mechanism 150. For example, an agent such as an adhesive, a resin or the like may be applied around the head of the adjustment screw 514A, or may be applied to a gap between the shaft portion 516A and the edge portion 517A of the window portion 517 (for example, two positions in an up-down direction along the optical axis L in FIG. 31), or the like. In this case also, similarly to the above-described embodiments, it is preferable to apply an agent to a position (region) which may suppress influence due to curing shrinkage.

EXPLANATION OF REFERENCES

10: imaging system
100: lens device
110: first optical adjustment mechanism
111: first optical adjustment mechanism
112: outer frame
113: outer frame
113A: window portion
113B: edge portion
114: inner frame
114A: inner frame
115: inner frame
115A: protruding portion
116: biasing spring
118: adjustment mechanism
118A: cylindrical cam
118B: convex portion
118C: taper pin
118D: convex portion
119: spring bias stopper
120: axial deviation suppression portion
120A: axial deviation suppression portion
122: protruding portion
124: contact portion
126: inner peripheral surface
127: one-sided portion
128: protrusion
129: one-sided surface
129A: protrusion
150: second optical adjustment mechanism
151: outer frame
152: inner frame
154: biasing spring
156: adjustment mechanism
156A: adjustment screw
159: spring bias stopper
160: axial deviation suppression portion
162: protruding portion
163: groove portion
164: inner peripheral surface
164A: protrusion
200: imaging device main body
210: processor
220: imaging element
300: monitor
500: third optical adjustment mechanism
510: outer frame
512: biasing spring
514: adjustment mechanism
514A: adjustment screw
514B: protruding portion
514C: plane
516: inner frame restriction portion
516A: shaft portion
517: window portion
517A: edge portion 518: spring bias stopper
520: pivot portion
521: protruding portion
522: contact portion
523: inner peripheral surface
524: arc surface
525: arm
526: cylindrical portion
530: inner frame
700: fixing region
710: fixing region
720: fixing region
H: height
L: optical axis
R: region

What is claimed is:

1. An optical adjustment mechanism comprising:
an outer frame;
an inner frame that is held by the outer frame and holds an optical element;
a biasing member that is disposed around the outer frame and biases the inner frame in a direction along an optical axis of the optical element; and
an axial deviation suppression portion that suppresses deviation of the inner frame in a direction intersecting the direction along the optical axis with respect to the outer frame,
wherein the axial deviation suppression portion has protruding portions disposed at a plurality of locations of the outer frame around the optical axis and protruding in the direction along the optical axis from the outer frame, and contact portions formed in the inner frame and coming into contact with the respective protruding portions.

2. The optical adjustment mechanism according to claim 1, further comprising:
an adjustment mechanism that presses the inner frame in a direction opposite to a direction of the bias, through a first pressing member.

3. The optical adjustment mechanism according to claim 2,
wherein the first pressing member comes into point contact with a convex portion provided on the inner frame.

4. The optical adjustment mechanism according to claim 2,
wherein the first pressing member is an eccentric roller, a taper pin, or a cylindrical cam.

5. The optical adjustment mechanism according to claim 2,
wherein a position of the inner frame in the direction along the optical axis and a tilt of the inner frame in a direction intersecting the optical axis are adjusted according to an adjustment of a pressing degree of the first pressing member.

6. The optical adjustment mechanism according to claim 1,
wherein an outer peripheral surface of the protruding portion and a contact surface of the contact portion come into point contact with each other.

7. The optical adjustment mechanism according to claim 6,
wherein the outer peripheral surface of the protruding portion and the contact surface of the contact portion come into point contact with each other at two points.

8. The optical adjustment mechanism according to claim 6,
wherein the contact portion is a groove portion having an inner peripheral surface, and the inner peripheral surface acts as a contact surface.

9. The optical adjustment mechanism according to claim 2,
wherein the axial deviation suppression portion is disposed on an inner peripheral side with respect to the adjustment mechanism.

10. The optical adjustment mechanism according to claim 1,
wherein the contact portion is a one-sided portion having a one-sided surface.

11. The optical adjustment mechanism according to claim 10,
wherein an outer peripheral surface of the protruding portion and the one-sided surface of the one-sided portion come into point contact with each other at one point.

12. The optical adjustment mechanism according to claim 1,
wherein the contact portions are disposed at three or more locations of the inner frame around the optical axis.

13. The optical adjustment mechanism according to claim 1,
wherein one or more contact portions are disposed in each of three regions formed by dividing a plane intersecting the optical axis into three equal parts.

14. The optical adjustment mechanism according to claim 1,
wherein an outer peripheral surface of the protruding portion and a contact surface of the contact portion are each an arc surface, and
the outer peripheral surface and the contact surface intersect to come into point contact with each other.

15. The optical adjustment mechanism according to claim 1,
wherein the contact portion is a groove portion that is formed in a direction toward an optical axis center from an outer peripheral portion of the inner frame and that receives the protruding portion.

16. The optical adjustment mechanism according to claim 1,
wherein the outer frame further includes a stopper that restricts the inner frame from falling off in the direction along the optical axis due to the bias.

17. An optical adjustment mechanism comprising:
an outer frame;
an inner frame that is held by the outer frame and holds an optical element;
a biasing member that is disposed around the outer frame and biases the inner frame in a direction along an optical axis of the optical element; and
an axial deviation suppression portion that suppresses deviation of the inner frame in the direction along the optical axis with respect to the outer frame,
wherein the axial deviation suppression portion has protruding portions disposed at a plurality of locations of the outer frame around the optical axis and protruding in the direction along the optical axis from the outer frame, and groove portions formed in a direction toward an optical axis center from an outer peripheral portion of the inner frame and receiving the respective protruding portions.

18. The optical adjustment mechanism according to claim 17, further comprising:
an adjustment mechanism that presses the inner frame in a direction opposite to a direction of the bias, through a first pressing member.

19. An optical adjustment mechanism comprising:
an outer frame;
an inner frame that is held by the outer frame and holds an optical element;
a biasing member that is disposed around the outer frame and biases the inner frame in a direction along an optical axis of the optical element;
an axial deviation suppression portion that suppresses deviation of the inner frame in the direction along the optical axis with respect to the outer frame; and
an adjustment mechanism that presses the inner frame in a direction opposite to a direction of the bias, through a second pressing member inserted and pulled out in the direction along the optical axis,
wherein the axial deviation suppression portion has protruding portions disposed at a plurality of locations of the outer frame around the optical axis and protruding in the direction along the optical axis from the outer frame, and groove portions formed in a direction toward an optical axis center from an outer peripheral portion of the inner frame and receiving the respective protruding portions.

* * * * *